(12) United States Patent
Yadav et al.

(10) Patent No.: US 11,106,868 B2
(45) Date of Patent: Aug. 31, 2021

(54) SYSTEM AND METHOD FOR LANGUAGE MODEL PERSONALIZATION

(71) Applicant: Samsung Electronics Co., Ltd, Suwon-si (KR)

(72) Inventors: Anil Yadav, Cupertino, CA (US); Abdul Rafay Khalid, Sunnyvale, CA (US); Alireza Dirafzoon, San Jose, CA (US); Mohammad Mahdi Moazzami, San Jose, CA (US); Pu Song, Newark, CA (US); Zheng Zhou, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 239 days.

(21) Appl. No.: 16/227,209

(22) Filed: Dec. 20, 2018

(65) Prior Publication Data
US 2019/0279618 A1    Sep. 12, 2019

Related U.S. Application Data

(60) Provisional application No. 62/639,114, filed on Mar. 6, 2018.

(51) Int. Cl.
*G06F 40/279*   (2020.01)
*G10L 15/22*    (2006.01)
(Continued)

(52) U.S. Cl.
CPC ........... *G06F 40/279* (2020.01); *G06F 40/20* (2020.01); *G10L 15/183* (2013.01);
(Continued)

(58) Field of Classification Search
CPC ...... G06F 40/30; G06F 16/3329; G06F 40/40; G06F 40/56; G06F 16/3331; G06F 40/20;
(Continued)

(56) References Cited

U.S. PATENT DOCUMENTS 8,396,709 B2    3/2013   Lloyd et al.
9,679,561 B2    6/2017   Bangalore et al.
(Continued)

FOREIGN PATENT DOCUMENTS

EP    2339576 A2    6/2011

OTHER PUBLICATIONS

International Search Report dated May 30, 2019 in connection with International Patent Application No. PCT/KR2019/002615, 3 pages.
(Continued)

*Primary Examiner* — Linda Wong

(57) ABSTRACT

A method, an electronic device, and computer readable medium is provided. The method includes identifying a set of observable features associated with one or more users. The method also includes generating latent features from the set of observable features. The method additionally includes sorting the latent features into one or more clusters. Each of the one or more clusters represents verbal utterances of a group of users that share a portion of the latent features. The method further includes generating a language model that corresponds to a specific cluster of the one or more clusters. The language model represents a probability ranking of the verbal utterances that are associated with the group of users of the specific cluster.

20 Claims, 12 Drawing Sheets

(51) Int. Cl.
*G10L 15/183* (2013.01)
*G06F 40/20* (2020.01)
*G10L 15/197* (2013.01)
*G10L 15/30* (2013.01)

(52) U.S. Cl.
CPC ............ *G10L 15/197* (2013.01); *G10L 15/22* (2013.01); *G10L 15/30* (2013.01)

(58) Field of Classification Search
CPC .......... G06F 16/90332; G06F 16/3344; G06F 40/284; G06F 16/9535; G06F 16/35; G06F 16/28; G06F 16/3346; G06F 16/438; G06F 16/45; G06F 16/90335; G06F 40/10; G06F 40/194; G06F 40/247; G06F 40/279; G06F 8/425; G06F 8/427; G06F 3/167; G06F 40/216; G06F 11/3612; G06F 16/243; G06F 16/24575; G06F 16/75; G06F 16/783; G06F 16/7867; G06F 16/90324; G06F 40/00; G06F 40/205; G10L 15/26; G10L 13/00; G10L 15/18; G10L 15/1822; G10L 15/005; G10L 15/08; G10L 17/00; G10L 2015/025; G10L 25/30; G10L 15/187; G10L 15/197; G10L 15/144; G10L 15/20; G10L 19/0018; G10L 15/22; G10L 15/1815; G10L 15/00; G10L 15/07; G10L 15/183; G10L 15/24; G06N 7/005; G06N 3/08

See application file for complete search history.

(56) References Cited

U.S. PATENT DOCUMENTS

| | | | |
|---|---|---|---|
| 9,747,895 B1 | 8/2017 | Jansche et al. | |
| 9,767,409 B1* | 9/2017 | Makhijani | G06F 16/7867 |
| 9,773,498 B2 | 9/2017 | Stern et al. | |
| 9,837,072 B2 | 12/2017 | Ljolje et al. | |
| 9,842,588 B2 | 12/2017 | Kim et al. | |
| 9,858,925 B2 | 1/2018 | Gruber et al. | |
| 9,870,500 B2 | 1/2018 | Dimitriadis et al. | |
| 10,242,019 B1* | 3/2019 | Shan | G06Q 30/02 |
| 10,546,006 B2* | 1/2020 | Zheng | G06F 16/35 |
| 2012/0316877 A1 | 12/2012 | Zweig et al. | |
| 2014/0324434 A1 | 10/2014 | Vozila et al. | |
| 2015/0161670 A1* | 6/2015 | Shen | G06Q 30/0269 705/14.66 |
| 2015/0325237 A1* | 11/2015 | Chang | G06F 16/24575 704/257 |
| 2015/0332672 A1* | 11/2015 | Akbacak | G06F 16/637 704/257 |
| 2016/0342682 A1* | 11/2016 | Moreno Mengibar | G06F 16/3344 |
| 2017/0032781 A1* | 2/2017 | Sharifi | G06F 40/284 |
| 2017/0177623 A1* | 6/2017 | Chen | G06F 16/285 |
| 2018/0213033 A1* | 7/2018 | Subbian | G06Q 10/10 |
| 2018/0336457 A1* | 11/2018 | Pal | G06N 3/0454 |

OTHER PUBLICATIONS

Written Opinion of the International Searching Authority dated May 30, 2019 in connection with International Patent Application No. PCT/KR2019/002615, 7 pages.

Song et al., "Auto-encoder Based Data Clustering", Nov. 20, 2013, 8 pages.

Amiri et al., "Learning Text Pair Similarity with Context-sensitive Autoencoders", Proceedings of the 54th Annual Meeting of the Association for Computational Linguistics, Aug. 7-12, 2016, 11 pages.

Supplementary European Search Report dated Jan. 21, 2021 in connection with European Patent Application No. 19 76 4203, 9 pages.

* cited by examiner

SYSTEM AND METHOD FOR LANGUAGE MODEL PERSONALIZATION

CROSS-REFERENCE TO RELATED APPLICATION AND CLAIM OF PRIORITY

This application claims priority under 35 U.S.C. § 119(e) to U.S. Provisional Patent Application No. 62/639,114 filed on Mar. 6, 2018. The above-identified provisional patent application is hereby incorporated by reference in its entirety.

TECHNICAL FIELD

This disclosure relates generally to electronic devices. More specifically, this disclosure relates to generating personalized language models for automatic speech recognition.

BACKGROUND

Methods are interacting with and controlling a computing device are continually improving in order to conform to more natural approaches. Many such methods for interacting with and controlling a computing device generally require a user to utilize a user interface instrument such as a keyboard, a mouse, or if the screen is a touch screen, a user can physically touch the screen itself to provide an input. Certain electronic devices employ voice-enabled user interfaces for enabling a user to interact with a computing device. Natural language usage is becoming the interaction method of choice with certain electronic devices and appliances. A smooth transition from natural language to the intended interaction can play an increasingly important role in consumer satisfaction.

SUMMARY

This disclosure provides a system and method for contextualizing automatic speech recognition.

In one embodiment, a method is provided. The method includes identifying a set of observable features associated with one or more users. The method also includes generating a set of latent features from the set of observable features. The method additionally includes sorting the latent features into one or more clusters, each of the one or more clusters representing verbal utterances of a group of users that share a portion of the latent features. The method further includes generating a language model that corresponds to a specific cluster of the one or more clusters. The language model represents a probability ranking of the verbal utterances that are associated with the group of users of the specific cluster.

In another embodiment, an electronic device is provided. The electronic device includes a processor. The processor is configured to identify a set of observable features associated with one or more users. The processor is also configured to generate a set of latent features from the set of observable features. The processor is additionally configured to sort the latent features into one or more clusters, each of the one or more clusters representing verbal utterances of a group of users that share a portion of the latent features. The processor is further configured to generate a language model that corresponds to a specific cluster of the one or more clusters. The language model represents a probability ranking of the verbal utterances that are associated with the group of users of the specific cluster.

In another embodiment, a non-transitory computer readable medium embodying a computer program is provided. The computer program includes computer readable program code that, when executed by a processor of an electronic device, causes the processor to identify a set of observable features associated with one or more users; generate a set of latent features from the set of observable features; sort the latent features into one or more clusters, each of the one or more clusters representing verbal utterances of a group of users that share a portion of the latent features; and generate a language model that corresponds to a specific cluster of the one or more clusters, the language model representing a probability ranking of the verbal utterances that are associated with the group of users of the specific cluster.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
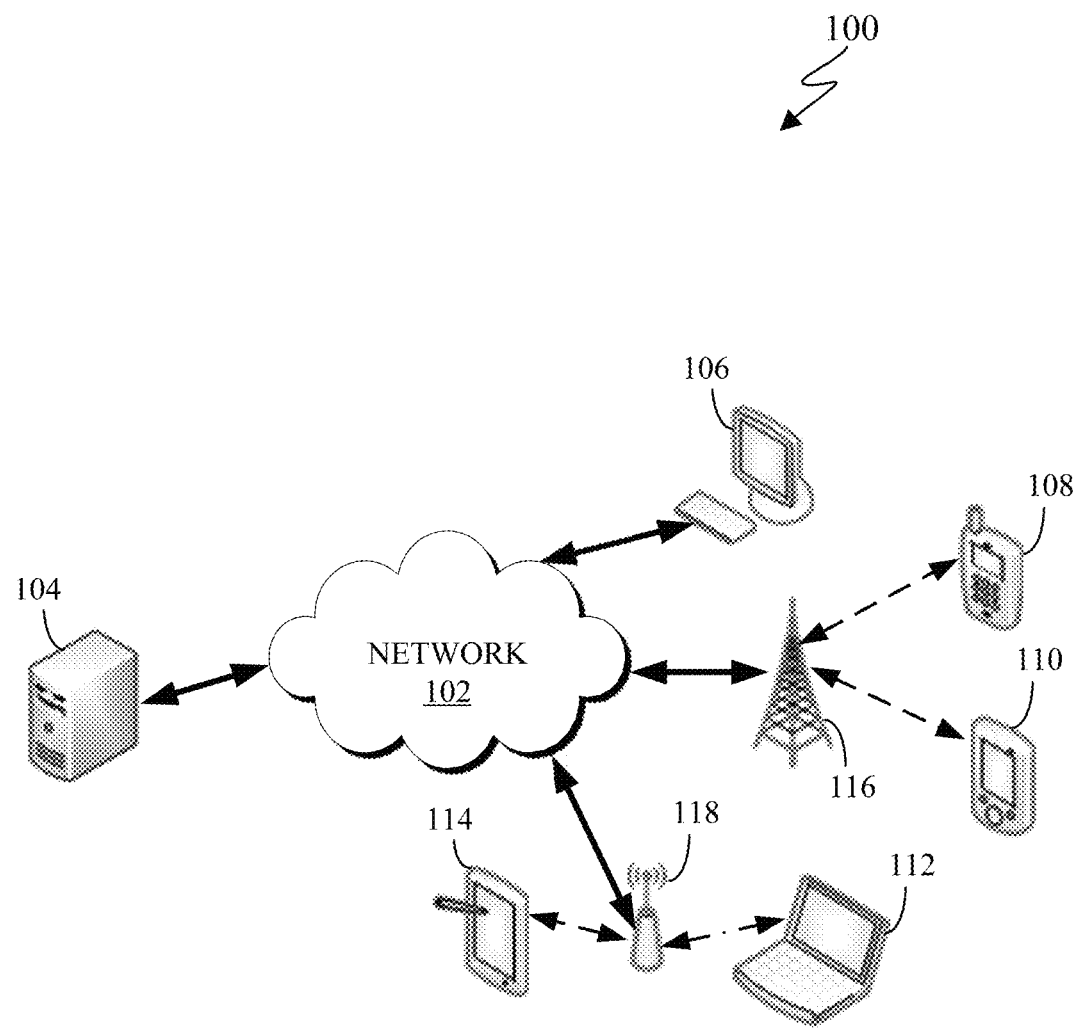
FIG. 1 illustrates an example communication system in accordance with embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the present disclosure, various methods for controlling and interacting with a computing device are provided. Graphical user interfaces allow a user interact with an electronic device, such as a computing device, by enabling a user to locate and select objects on a screen. Common interactions include physical manipulations, such as, a user physically moving a mouse, typing on a keyboard, touching a touch screen of a touch sensitive surface, among others. There are instances when utilizing various physical interaction such as touching a touchscreen are not feasible, such as when a user wears a head mounted display, or if the device does not include a display, and the like. Additionally, there are instances when utilizing various physical interactions such as touching a touchscreen or using an accessory (such as a keyboard, mouse, touch pad, remote, or the like) is inconvenient or cumbersome. Embodiments of the present disclosure also allow for additional approaches to interact with an electronic device. It is noted that as used herein, the term "user" may denote a human or another device (such as an artificial intelligent electronic device) using the electronic device.

An electronic device, according to embodiments of the present disclosure, can include personal computers (such as a laptop, a desktop), a workstation, a server, a television, an appliance, and the like. Additionally, the electronic device can be at least one of a part of a piece of furniture or building/structure, an electronic board, an electronic signature receiving device, a projector, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device, among others. The electronic device is one or a combination of the above-listed devices. Additionally, the electronic device as disclosed herein is not limited to the above-listed devices, and can include new electronic devices depending on the development of technology.

According to embodiments of the present disclosure, a natural approach to interacting with and controlling a computing device is a voice enabled user interface. Voice-enabled user interfaces enable a user to interact with a computing device through the act of speaking. Speaking can include a human speaking directly to the electronic device or another electronic device projecting sound through a speaker. Once the computing device detects and receives the sound, the computing device can derive contextual meaning from the oral command and thereafter perform the requested task.

Certain automatic speech recognition (ASR) systems enable the recognition and translation of spoken language into text on a computing device, such as speech to text. Additionally, ASR systems also can include a user interface that that performs one or more functions or actions based on the specific instructions received from the user. For example, if a user recited "call spouse" to a telephone, the phone can interpret the meaning of the user, by looking up a phone number associated with 'spouse,' and dial the phone number associated with the 'spouse' of the user. Similarly, if a user verbally spoke "call spouse" to a smart phone, the smart phone can identify the task as a request to use the phone function and activate the phone feature of the device, looking up a phone number associated with 'spouse,' and subsequently dial the phone number of the spouse of the user. In another example, a user can speak "what is the weather," to a particular device, and the device, and the device can look up the weather based on the location of the user, and either display the weather on a display or speak the weather to the user through a speaker. In another example, a user can recite "turn on the TV," to an electronic device, and a particular TV will turn on.

Embodiments of the present disclosure recognize and take into consideration that certain verbal utterances are more likely to be spoken than others. For example, certain verbal utterances are more likely to be spoken than others based on the context. Therefore, embodiments of the present disclosure provide systems and methods that associate context with particular language models to derive an improved ASR system. In certain embodiments, context can include (i) domain context, (ii) dialog flow context, (iii) user profile context, (iv) usage log context, (v) environment and location context, and (vi) device context. Domain context indicates the subject matter of the verbal utterance. For example, if the domain is music, a user is more likely to speak a song name, an album name, an artist name. Domain flow context is based on the context of the conversation itself. For example, if the user speaks "book a flight to New York," the electronic device can respond by saying "when." The response by the user to the electronic device specifying a particular date is in response to the question by the electronic device, and not an unrelated utterance. User profile context can associate vernacular and pronunciation that is associated with a particular user. For example, based on the age, gender, location and other biographical information, a user is more likely to speak certain words than others. For instance based on the location of the user the verbal utterance of "ya'll" is more common than the utterance of "you guys." Similarly, based on the location of the user the verbal utterance of "traffic circle" is more common than "round-a-bout," even though the both utterances refer to the same object. Usage logs indicate a number of frequently used commands. For example, based on usage logs, if a verbal utterance is common, the user is more likely to use the same command again. Environment and location of the user assist the electronic device to understand accents or various pronunciations of similar words. The device context indicates the type of electronic device. For example, if the electronic device is a phone, or an appliance, the verbal utterances of the user can vary. Moreover, the context is based on identified interests of the user and creating a personalized language model that indicates a probability that certain verbal utterances are more likely to be spoken than others, based on the individual user.

Embodiments of the present disclosure also take into consideration that certain language models can include various models for different groups in the population. Such models do not discover interdependences between contextual features as well as latent features that are associated with a particular user. For example, a language model can be trained in order to learn how the English language (or any other language) behaves. A language model can so be domain specific, such as a specific geographical or regional area for specific persons. Therefore, embodiments of the present disclosure provide a contextual ASR system that uses data from various aspects, such as different contexts, to provide a rescoring of utterances for greater accuracy and understanding by the computing device.

Embodiments of the present disclosure provide systems and methods for contextualizing ASR systems by building personalized language models. A language model is a probability distribution of sequences of words. For example, a language model estimates by relative likelihood of different phrases for natural language processing that is associated with ASR systems. For example, in an ASR system, the electronic device attempts to match sounds with word sequences. A language model provides context to distinguish between words and phrases that sound similar. In certain embodiments, separate language models can be generated for each group in a population. Grouping can be based on observable features.

Additionally, embodiments of the present disclosure provide systems and methods for generating a language model that leverages latent features that are extracted from user profiles and usage patterns. User profiles and usage patterns are an example of observable features. Observable features can include both classic features and augmented features. In certain embodiments, observable features include both.

According to embodiments of the present disclosure, personalized language models improve speech recognition, such as those associated with ASR systems. The personalized language models can also improve various predictive user inputs, such as a predictive keyboard and smart autocorrect functions. The personalized language models can also improve personalized machine translation systems as well as personalized handwriting recognition systems.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, one or more network interfaces facilitating communication over the network 102. In certain embodiments, the server 104 is an ASR system that can identify verbal utterances of a user. In certain embodiments, the server generates language models, and provides the language model to one of the client devices 106-114 to that perform the ASR. Each of the generated language models can be adaptively used in any of the client devices 106-114. In certain embodiments, the server 104 can include a neural network such as an auto-encoder that derives latent features from a set of observable features that are associated with a particular user. Additionally, in certain embodiments, the server 104 can derive latent features from a set of observable features.

Each client device 106-114 represents any suitable computing or processing device that interacts with at least one server (such as server 104) or other computing device(s) over the network 102. In this example, the client devices 106-114 include a desktop computer 106, a mobile telephone or mobile device 108 (such as a smartphone), a personal digital assistant (PDA) 110, a laptop computer 112, and a tablet computer 114. However, any other or additional client devices could be used in the system 100. A smartphones represent a class of mobile devices 108 that are a handheld device with a mobile operating system and an integrated mobile broadband cellular network connection for voice, short message service (SMS), and internet data communication. As described in more detail below, an electronic device (such as the mobile device 108, PDA 110, laptop computer 112, and the tablet computer 114) can include a user interface engine that modifies one or more user interface buttons displayed to a user on a touchscreen.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) transmits information securely and efficiently to another device, such as, for example, the server 104. The mobile device 108 (or any other client device 106-114) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device to receive a verbal utterance from a user, and through an ASR system derive identify and understand the received verbal utterance from the user. In certain embodiments, the server 104 or any of the client devices 106-114 can generate a personalized language model the ASR system of a client device 106-114 to derive identify and understand the received verbal utterance from the user.

Figure 2:
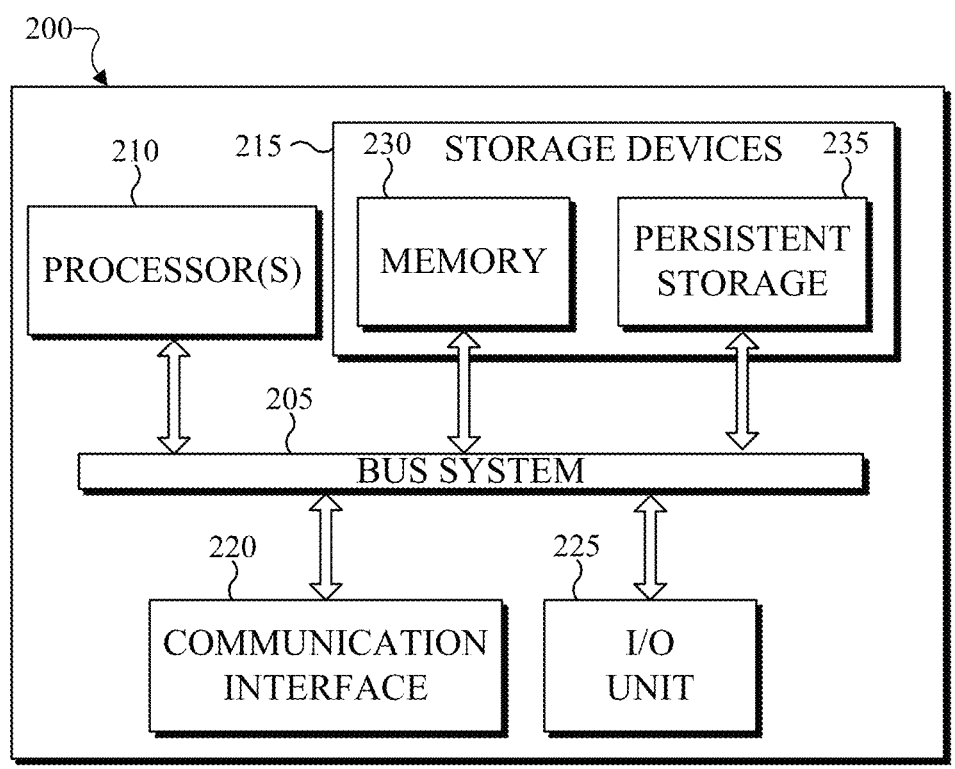
FIG. 2 illustrates an example electronic device in accordance with an embodiment of this disclosure.
Figure 3:
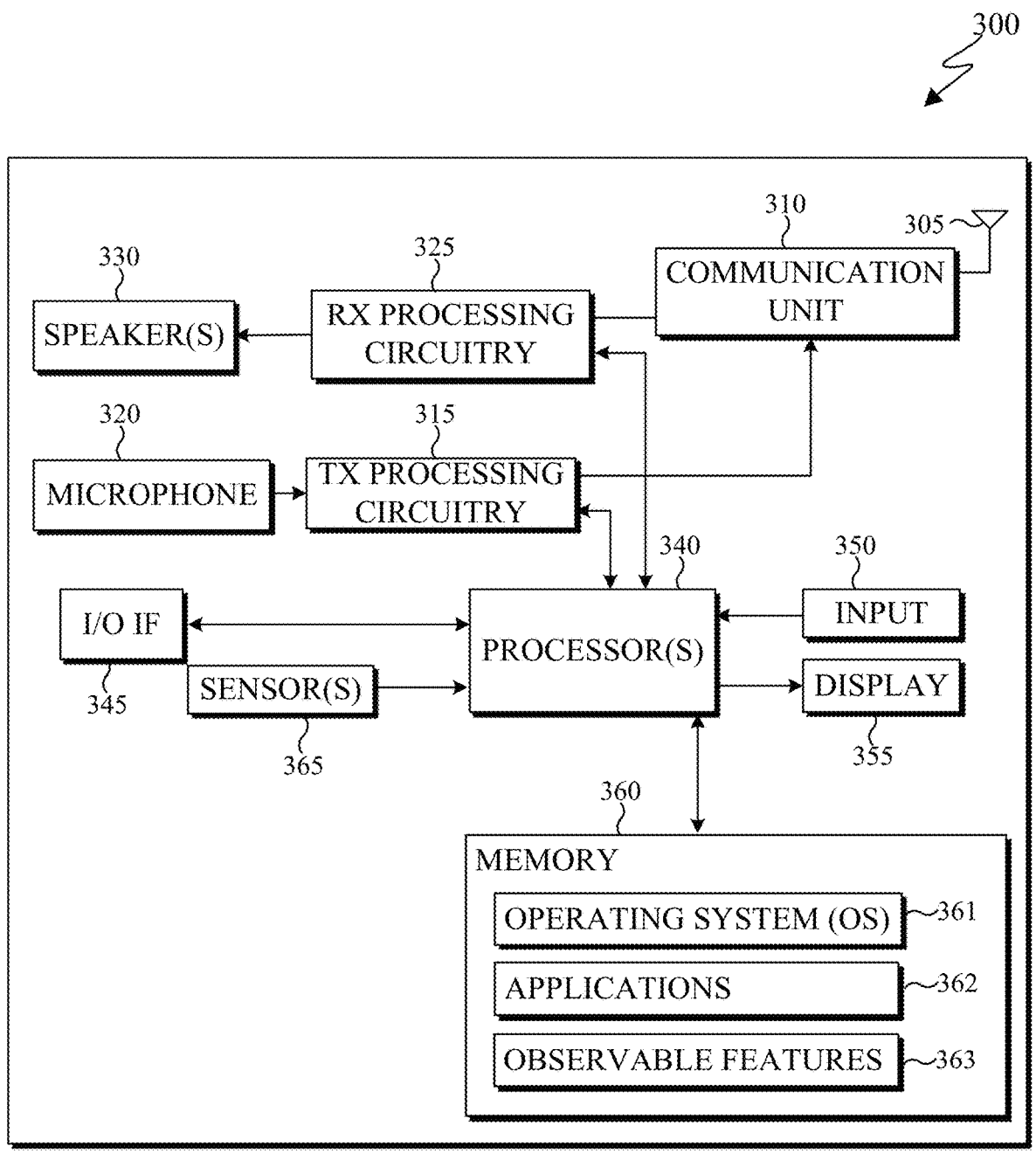
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

The server 200 can represent one or more local servers, one or more remote servers, a clustered computers and components that act as a single pool of seamless resources, a cloud based server, a neural network, and the like. The server 200 can be accessed by one or more of the client devices 106-114.

As shown in FIG. 2, the server 200 includes a bus system 205 that supports communication between at least one processing device 210, at least one storage device(s) 215, at least one communications interface 220, and at least one input/output (I/O) unit 225.

The processing device 210, such as a processor, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

In certain embodiments, the server 200 is an ASR system that includes a neural network such as an auto-encoder. In certain embodiments, the auto-encoder is included in an electronic device, such as the electronic device 300 of FIG. 3. The server 200 is able to derive latent features from observable features that are associated with users. In certain embodiments, the server 200 is also able to generate multiple language models based on derived latent features. The multiple language models are then used to generate a personalized language model for a particular user. In certain embodiments, the personalized language model is generated by the server 200 or a client device, such as the client devices 106-114 of FIG. 1. It should be noted that the multiple language models can also be generated on any of the client devices 106-114 of FIG. 1.

A neural network is a combination of hardware and software that is patterned after the operations of neurons in a human brain. Neural network can solve and extract information from complex signal processing, pattern recognition, or pattern production. Pattern recognition includes the recognition of objects that are seen, heard, felt, and the like.

Neural networks process can handle information differently. For example, a neural network has a parallel architecture. In another example, information is represented, processed, and stored by a neural network varies from a conventional computer. The inputs to a neural network are processed as patterns of signals that are distributed over discrete processing elements, rather than binary numbers. Structurally, a neural network involves a large number of processors that operate in parallel and arranged in tiers. For example, the first tier receives raw input information and each successive tier receives the output from the preceding tier. Each tier is highly interconnected, such that each node in tier n can be connected to multiple nodes in tier n−1 (such as the nodes inputs) and in tier n+1 that provides input for those nodes. Each processing node includes a set of rules that it was originally given or developed for itself over time.

For example, a neural network can recognize patterns in sequences of data. For instance, a neural network can recognize a pattern from observable features associated with one user or many users. The neural network can analyze the observable features and derive from the observable features, latent features.

The architectures of a neural network provide that each neuron can modify the relationship between inputs and outputs by some rule. One type of a neural network is a feed forward network in which information is passed through nodes, but not touching the same node twice. Another type of neural network is a recurrent neural network. A recurrent neural network can include a feedback loop that allows a node to be provided with past decisions. A recurrent neural network can include multiple layers, in which each layer includes numerous cells called long short-term memory ("LSTM"). A LSTM can include an input gate, an output gates, and a forget gate. A single LSTM can remember a value over a period of times and can assist in preserving an error that can be back propagated through the layers of the neural network.

Another type of a neural network is an auto-encoder. An auto-encoder derives, in an unsupervised manner, an efficient data coding. In certain embodiments, an auto-encoder learns a representation for a set of data for dimensionality reduction. For example, an auto-encoder learns to compress data from the input layer into a short code, and then uncompressed that code into something that substantially matches the original data Neural networks can be adaptable such that a neural network can modify itself as the neural network learns and performs subsequent tasks. For example, initially a neural network can be trained. Training involves providing specific input to the neural network and instructing the neural network what the output is expected. For example, a neural network can be trained to identify when to a user interface object is to be modified. For example, a neural network can receive initial inputs (such as data from observable features). By providing the initial answers, allows a neural network to adjust how the neural network internally weighs a particular decision to perform a given task. The neural network is then able to derive latent features from the observable features. In certain embodiments, the neural network can then receive feedback data that allows the neural network to continually improve various decision making and weighing processes, in order to remove false positives and increase the accuracy and efficiency of each decision.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications, such providing and receiving information from a neural network. In certain embodiments, the electronic device 300 is useable user interface applications that can modify a user interface based on state data of the electronic device 300 and parameters of a neural network. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108 of FIG. 1, the PDA 110 of FIG. 1, the laptop computer 112 of FIG. 1, and the tablet computer 114 of FIG. 1), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 one or more applications 362, and observable features 363.

The communication unit 310 receives, from the antenna 305, an incoming RF signal transmitted such as a BLUETOOTH or WI-FI signal from an access point (such as a base station, WI-FI router, Bluetooth device) of the network 102 (such as a WI-FI, Bluetooth, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing ASR processing and the like. The processor 340 can move data into or out of the memory 360 as required by an executing process. In some embodiments, the processor 340 is configured to execute plurality of applications 362 based on the OS 361 or in response to signals received from eNBs or an operator. Example, applications 362 that include a camera application (for still images and videos), a video phone call application, an email client, a social media client, a SMS messaging client, a virtual assistant, and the like. In certain embodiments, the processor 340 is configured to receive acquire, and derive the observable features 363. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) 365 and/or a camera by providing additional input to processor 340. In certain embodiments, sensor 365 includes inertial measurement units (IMU) (such as, accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, flash memory, or optical disc. The memory 360 also can contain observable features 363 that are received or derived from classic features as well as augmented features. Classic features include information derived or acquired form the user profile, such as, the age of the user, the location of the user, the education level of the user, the gender of the user, and the like. Augmented features are acquired or derived from various other services or sources. For example, augmented features can include information generated by the presence of a user on social media, emails and SMS messages that are transmitted to and from the user, the online footprint of the user, and usage logs of utterances (both verbal and electronically inputted, such as typed), and the like.

An online footprint is the trail of data generated by the user while the user accesses the Internet. For example, an online footprint of a user represents traceable digital activities, actions, contributions and communications that are manifested on the Internet. An online footprint can include websites visited, internet search history, emails sent, information submitted to various online services. For example, when a person visits a particular website, the website can save the IP address that identifies the person's internet service provider, the approximate location of the person. An online footprint can also include a review the user provided to a product, service, restaurant, retail establishment, and the like. An online footprint of a user can also blog postings, social media postings, Electronic device 300 further includes one or more sensor(s) 365 that can meter a physical quantity or detect an activation state of the electronic device 300 and convert metered or detected information into an electrical signal. For example, sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include a control circuit for controlling at least one of the sensors included therein. Any of these sensor(s) 365 can be located within the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4A:
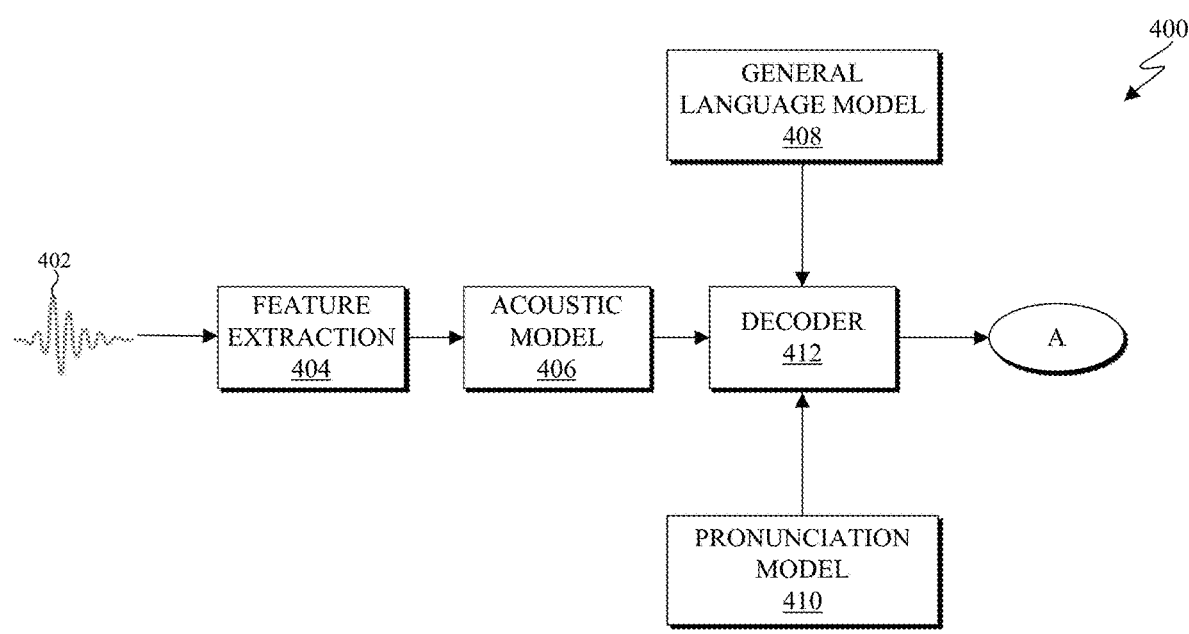
FIGS. 4A and 4B illustrate an automatic speech recognition system in accordance with an embodiment of this disclosure.
Figure 4B:
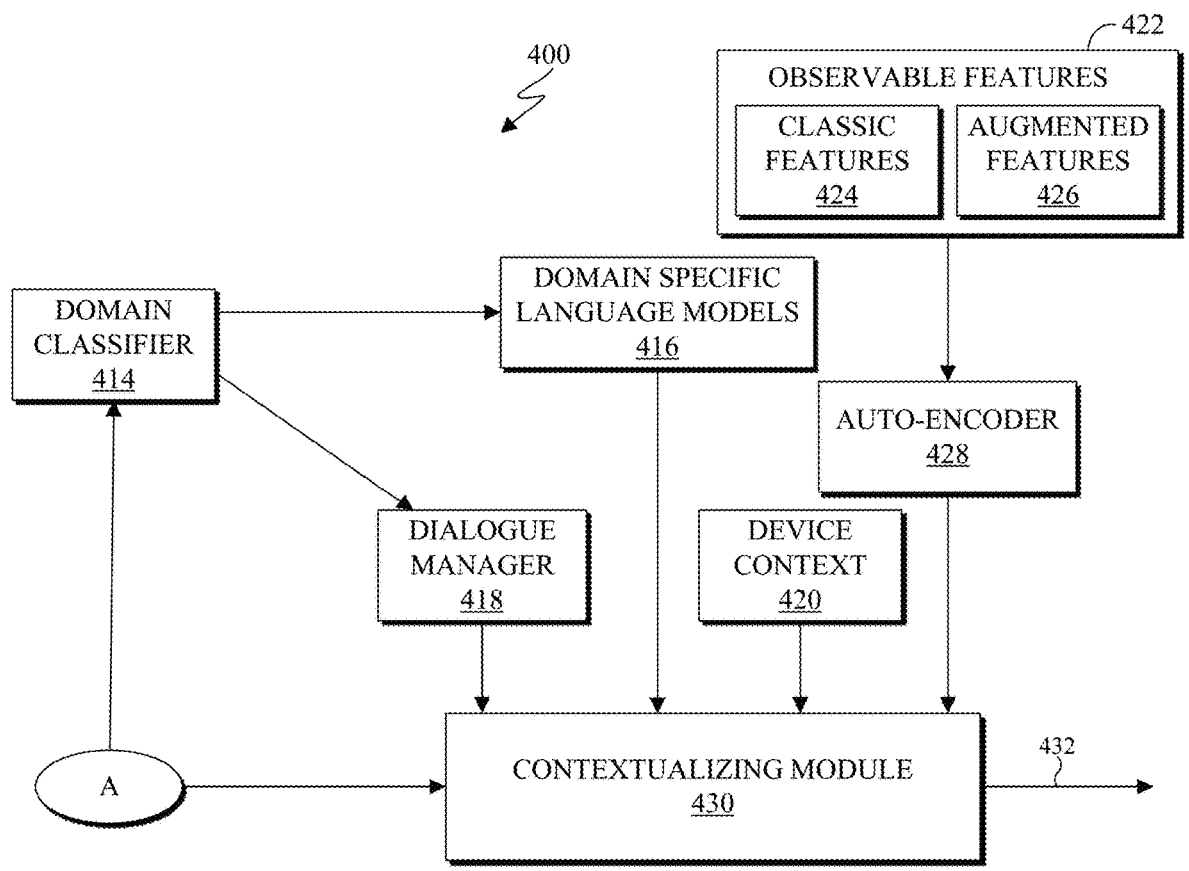

FIGS. 4A and 4B illustrate an example ASR system 400 in accordance with an embodiment of this disclosure. FIGS. 4A and 4B illustrate a high-level architecture, in accordance with an embodiment of this disclosure. FIG. 4B is a continuation of FIG. 4A. The embodiment of the ASR system 400 shown in FIGS. 4A and 4B are for illustration only. Other embodiments can be used without departing from the scope of the present disclosure.

The ASR system 400 includes various components. In certain embodiments, some of the components included in the ASR system 400 can in included in a single device, such as the mobile device 108 of FIG. 1 that includes internal components similar to the electronic device 300 of FIG. 3. In certain embodiments, a portion of the components included in the ASR system 400 can in included in two or more devices, such as the server 104 of FIG. 1, which can include internal components similar to the server 200 of FIG. 2, and the mobile device 108, which can include internal components similar to the electronic device 300 of FIG. 3. The ASR system 400 includes a received verbal utterance 402, feature extraction 404, an acoustic model 406, a general language model 408, a pronunciation model 410, a decoder 412, a domain classifier 414, a domain specific language models 416, dialogue manager 418, device context 420, observable features 422, an auto-encoder 428, a contextualizing module 430, and a generated output 432 of a personalized language model.

The verbal utterance 402 is an audio signal that is received by an electronic device, such as the mobile device 108, of FIG. 1. In certain embodiments, the verbal utterance 402 can be created by a person speaking to the electronic device 300, and a microphone (such as the microphone 320 of FIG. 3)

coverts the sound waves into electronic signals that the mobile device 108 can process. In certain embodiments, the verbal utterance 402 can be created by another electronic device, such as an artificial intelligent electronic device, sending an electronic signal or generating noise through a speaker that is received by mobile device 108.

The feature extraction 404 preprocesses the verbal utterance 402. In certain embodiments, the feature extraction 404 performs noise cancelation with respect to the received verbal utterance 402. The feature extraction 404 can also perform echo cancelation with respect to the received verbal utterance 402. The feature extraction 404 can also extract features from the received verbal utterance 402. For example, using a Fourier Transform, the feature extraction 404 extracts various features from the verbal utterance 402. In another example, using a Mel-Frequency Cepstral coefficients (MFCC), the feature extraction 404 extracts various features from the verbal utterance 402. Since audio is susceptible to noise, the feature extraction 404 extracts specific frequency components from the verbal utterance 402. For example, a Fourier Transform transforms a time domain signal to frequency domain in order to generate the frequency coefficients.

The acoustic model 406 generates a probabilistic models of relationships between acoustic features and phonetic units, such as phonemes and other linguistic units that comprise speech. The acoustic model 406 provides the decoder 412 with the probabilistic relationships between the acoustic features and the phonemes. In certain embodiments, the acoustic model 406 can receive the MFCC features that are generated in the feature extraction 404 and then classify each frame as a particular phoneme. Each frame is a small portion of received verbal utterance 402, based on time. For example, a frame is a predetermined time duration of the received verbal utterance 402. A phoneme is a unit of sound. For example, the acoustic model 406 can convert the received verbal utterance 402, such as "SHE" into phoneme of "SH" and "IY." In another example, the acoustic model 406 can convert the received verbal utterance 402, such as "HAD" into phoneme of "HH," "AA," and "D." In another example, the acoustic model 406 can convert the received verbal utterance 402, such as "ALL" into phoneme of "AO" and "L."

The general language model 408 models word sequences. For example, the general language model 408 determines the probability of a sequence of words. The general language model 408 provides the probability of what word sequences are more likely that other word sequences. For example, the general language model 408 provides the decoder 412 various probability distributions that associated with a given sequence of words. The general language model 408 identifies the likelihood of different phrases. For example, based on context, the general language model 408 can distinguish between words and phrases that sound similar.

The pronunciation model 410 maps words to phonemes. The mapping of words to phoneme can be statistical. The pronunciation model 410 converts phoneme into words that are understood by the decoder 412. For example, pronunciation model 410 converts the phoneme of "HH," "AA," and "D" into "HAD."

The decoder 412 receives (i) the probabilistic models of relationships between acoustic features and phonetic units from the acoustic model 406, (ii) probability associated with particular sequence of words from the general language model 408, and (iii) the converted phoneme are can be understood by the decoder 412. The decoder 412 searches for the best word sequence based on a given acoustic signal.

The outcome of the decoder 412 is limited based on the probability rating of a sequence of words as determined by the general language model 408. For example, the general language model 408 can represent one or more language models that are trained to understand vernacular speech patterns of a portion of the population. For example, the general language model 408 is not based on a particular person, rather it is based on a large grouping of persons that have different ages, genders, locations, interests, and the like.

Embodiments of the present disclosure take into consideration that the to increase the accuracy of the ASR system 400 the language model is tailored to the user who is speaking or created the verbal utterance 402, rather than a general person or group of persons. Based on the context, certain utterances are more likely than other utterances. For example, each person when speaking uses a slightly different the sequence of words. The changes can be based on the individuals age, gender, geographic location, interests, and speaking habits. Therefore, creating a language model that is unique to each person can improve the overall outcome of the ASR system 400. In order to create a language model, written examples, and verbal examples are needed. When a user enrolls in a new ASR system, very little information is known about the user. Certain information can be learned based on a profile of the user, such as the age, gender, location, and the like. Generating a language model that is tailored to a specific person identifies and then compares latent features of the user to multiple language models. Based on the level of similarity between the latent features of the specific person and the various language models, a personalized language model can be created for the particular user.

The decoder 412 derives a series of words based on a particular phoneme sequence that corresponds to the highest probability. In certain embodiments, the decoder 412 can create a single output or a number of likely sequences. If the decoder 412 outputs a number of likely sequences, the decoder 412 can also create a probability that is associated with each sequence. To increase the accuracy of the output from the decoder, a language model that is personalized to the speaker of the verbal utterance 402 can increase the series of words as determined by the decoder 412.

To create a language model for a particular person, the observable features 422 are gathered for a particular person. Additionally, a personalized language model is based on various contexts associated with the verbal utterance of the user. For example, the decoder 412 can also provide information to the domain classifier 414. Further, a personalized language model can be based on the type of device that receives the verbal utterance, identified by the device context 420.

The domain classifier 414 is a classifier which identifies various language or audio features from the verbal utterance to determine the target domain for the verbal utterance. For example, the domain classifier 414 can identify the domain context, such as the topic associated with the verbal utterance. If the domain classifier 414 identifies that the domain context is music, then the contextualizing module 430 will be able to determine that the next sequence of words will most likely be associated with music, such as an artist's name, an albums name, a song title, lyrics to a song, and the like. If the domain classifier 414 identifies that the domain context is movies, then the contextualizing module 430 will be able to determine that the next sequence of words will most likely be associated with moves, such as actors, genres directors, movie titles, and the like. If the domain classifier 414 identifies that the domain context is sports, then the contextualizing module 430 will be able to determine that the next sequence of words will most likely be associated with sports, such as a type of sport (football, soccer, hockey, basketball, and the like), as well as athletes, commentators, to name a few. In certain embodiments, the domain classifier 414 is external to the ASR system 400.

The domain classifier 414 can output data into the domain specific language models 416 and the dialogue manager 418. Language models within the domain specific language models 416 include langue models that are trained using specific utterances from within a particular domain context. For example, the domain specific language models 416 include langue models that are associated with specific domain contexts, such as music, movies, sports, and the like.

The dialogue manager 418 identifies the states of dialogue between the user and the device. For example, the dialogue manager 418 can capture the current action that is being executed to identify which parameters have been received and which are remaining. In certain embodiments, the dialogue manager 418 can also derive the grammar associated with the verbal utterance. For example, the dialogue manager 418 can derive the grammar that is associated with each state in order to describe the expected utterance. For example, if the ASR system 400 prompts the user for a date, the dialogue manager 418 provides a high probability that the verbal utterance that is received from the user will be a date. In certain embodiments, grammar that is derived from the dialogue manager 418 are not be converted to a language model, as the contextualizing module 430 uses an indicator of a match of the verbal utterance with the derived language output.

The device context 420 identifies the type of device that receives the verbal utterance. For example, a personalized language model can be based on the type of device that receives the verbal utterance. Example devices include a mobile phone, a TV, an appliance such as an oven, a refrigerator, and the like. For example, the verbal utterance of "TURN IT UP" when spoken to the TV can indicate that that user wants the volume louder, whereas spoken to the oven, can indicate that the temperature is to be higher.

The observable features 422 include classic features 424 and augmented features 426. The classic features 424 can include biographical information about the individual (such as age, gender, location, hometown, and the like). The augmented features 426 can include features that are acquired about the user, such as SMS text messages, social media posts, written reviews, written blogs, logs, environment, context, and the like. The augmented features 426 can be derived by the online footprint of the user. The augmented features 426 can also include derived interests of a user such as hobbies of the particular person. In certain contexts (such as sports, football, fishing, cooking, ballet, gaming, music, motor boats, sailing, opera, and the like), various word sequences can appear more than others based on each particular hobby or interest. Analyzing logs of the user enables the language model to derive trends of what the particular person has spoken or written in the past, which provides an indication as to what the user will possible speak in the future. The environment identifies where the user is currently. Persons that are in certain locations often speak with particular accents, or use certain words when speaking. For example, regional differences can cause different pronunciations, and dialects. For example, "YA'LL" as compared to "YOU GUYS," "POP" as compared to "SODA," and the like. Context can include the subject matter associated with the verbal utterance 402 as well as whom the speaker of the verbal utterance 402 is directed to. For example, the context of the verbal utterance can change if the verbal utterance 402 is directed to an automated system over a phone line, or to an appliance.

The observable features 422 can be gathered and represented as a single multi-dimensional vector. Each dimension of the vector could represent a meaning characteristic related to the user. For example, a single vector can indicate a gender of the user, a location of the user, interests of the user, based on the observable features 422. The vector that represents the observable features 422 can encompass many dimensions due to the vast quantities of information included in the observable features 422 that are associated with a single user. Latent features that are derived from the observable features 422 via the auto-encoder 428. The latent features are latent contextual features that are based on hidden similarities between users. The derived latent features provide connections between two or more of the observable features 422. For example, a latent feature, derived by the auto-encoder 428, can correspond to a single dimension of the multi-dimensional vector. The single dimension of the multi-dimensional vector can correspond to multiple aspects of a person's personality. Latent features are learned by training an auto-encoder, such as the auto-encoder 428, on observable features, similar to the observable features 422.

The auto-encoder 428 performs unsupervised learning based on observable features 422. The auto-encoder 428 is a neural network that is performs unsupervised learning of efficient coding. The auto-encoder 428 is trained to compress data from an input layer into a short code, and then uncompressed that code into content that closely matches the original data. The short code represents the latent features. Compressing the input creates the latent features that are hidden within the observable features 422. The short code is compressed to a state, such that the auto-encoder 428 can reconstructs to input. As a result, the input and the output of the auto-encoder 428 are substantially similar. The auto-encoder compresses the information, such that multiple pieces of information included in the observable features 422 are within a single vector. Compressing the information included in the observable features 422 into a lower diminution creates a meaningful representation that includes a hidden or latent meaning. The auto-encoder 428 is described in greater detail below with respect to FIGS. 5A, 5B, and 5C.

The contextualizing module 430 selects the top-k hypothesis from the decoder 412, and rescores the values. The values are rescored based on the domain specific language (as identified by the domain specific language models 416), the grammars for the current dialog state (from the dialogue manager 418), the personalized language model (as derived via the observable features 422, the auto-encoder 428), and the device context 420. The contextualizing module 430 rescores the probabilities that are associated with each sequence as identified by the decoder 412.

The contextualizing module 430 rescores the probabilities of from the decoder 412. For example, the contextualizing module 430 rescores the probabilities based on Equation 1, below:

$$P_{LM}(W \mid C) \propto \frac{\prod_{i=1}^{k} P_{LM}(W \mid S_i)}{P_{LM}(W)^{k-1}} \quad (1)$$

Equation 1 describes that the of a word sequence given by a subset $S_i$ of various context elements. The element 'W' is the sentence hypothesis $[W_0 \ldots W_k]$, with $W_i$ being the $i^{th}$ word in the sequence of the expression $C=\{C_i\}_{i=1,\ldots,N}$. The expression $C_i \in$ {domain, state, user profile, usage logs, environment, device, and the like} and each $S_i \subset C$ is a subset of C containing mutually dependent elements. The expression $S_i$ and $S_j$ are mutually independent $\forall j \neq i$. For example, the expression $S_i$={location, weather} and the expression $S_2$={age, gender}. As a result, the expression $P_{LM}(W|S_1)$ represents the probability of word sequence in the language model created from $S_1$, that of the location of the user and the weather.

If all the context elements are mutually independent, the contextualizing module 430 rescores the probabilities based on Equation 2, below:

$$P_{LM}(W|C) \propto \frac{\prod_{i=1}^{k} P_{LM}(W|C_i)}{P_{LM}(W)^{k-1}} \quad (2)$$

In Equation 2 above, $P_{LM}(W|C)$ represents the probability of a word sequence in the context of a specific language model, for context $C_i$. For example, the expression $P_{LM}(W|Domain)$ is the probability of a word sequence in the domain specific language model. The expression, $P_{LM}(W|State)$ is the probability of a word sequence in the grammar of this state. Similarly, the expression $P_{LM}(W|User\ Profile)$ is the probability of a word sequence given the profile of the user. The expression $P_{LM}(W|User\ Logs)$ is the probability of a word sequence in the language model created from the usage logs of the user. The expression $P_{LM}(W|Environment)$ is the probability of a word sequence in the language model for the current environment of the user. The expression $P_{LM}(W|Device)$ is the probability of a word sequence in the language model for the current device that the user is speaking to.

The output 432 from the contextualizing module 430 is the speech recognition based on the personal language model of the user who created the verbal utterance 402.

Figure 4C:
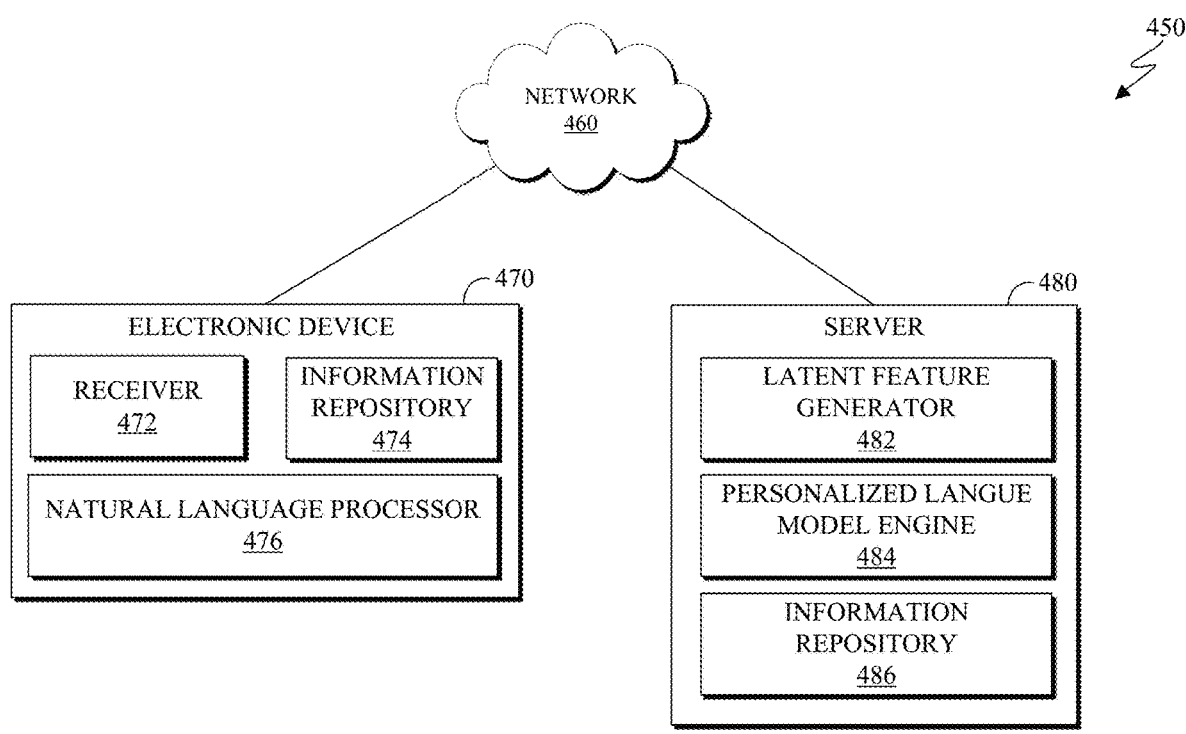
FIG. 4C illustrates a block diagram of an example environment architecture, in accordance with an embodiment of this disclosure.

FIG. 4C illustrates a block diagram of an example environment architecture 450, in accordance with an embodiment of this disclosure. The embodiment of the environment architecture 450 is for illustration only. Other embodiments can be used without departing from the scope of the present disclosure.

Environment architecture 450 includes an electronic device 470 communicating with a server 480 over network 460. The electronic device 470 can be configured similar to any of the one or more client devices 106-116 of FIG. 1, and can include internal components similar to that of electronic device 300 of FIG. 3. The server 480 can be configured similar to the server 104 of FIG. 1, and can include internal components similar to that of server 200 of FIG. 2. The components, or a portion of the components of the server 480 can be included in electronic device 470. A portion of the components of the electronic device 470 can be included in server 480. For example the sever 480 can generate the personalized language models as illustrated in FIG. 4C. Alternatively the electronic device 470 can generate the personalized language models. For instance, either the electronic device 470 or the sever 480 can include an auto-encoder (such as the auto-encoder 428 of FIG. 4B) to identify the latent features from a set of observable features 422 that are associated with the user of the electronic device 470. After the latent features are identified, the electronic device 470 or the server 480 can create the personalized language models of the particular user. The electronic device 470 can also adaptively use language models provided by the server 480 in order to create personalized language models that are particular to the user of the electronic device 470.

The network 460 is similar to the network 102 of FIG. 1. In certain embodiments, the network 460 represents a "cloud" of computers interconnected by one or more networks, where the network is a computing system utilizing clustered computers and components to act as a single pool of seamless resources when accessed. In certain embodiments, the network 460 is connected with one or more neural networks (such as the auto-encoder 428 of FIG. 4B), one or more servers (such as the server 104 of FIG. 1), one or more electronic devices (such as any of the client devices 106-116 of FIG. 1 and the electronic devices 470). In certain embodiments, the network can be connected to an information repository, such as a database, that contains a look-up tables and information pertaining to various language models, and ASR systems, similar to the ASR system 400 of FIGS. 4A and 4B.

The electronic device 470 is an electronic device that can receive a verbal utterance, such as the verbal utterance 402 of FIG. 4A, and perform a function based on the received verbal utterance. In certain embodiments, the electronic device 470 is a smart phone, similar to the mobile device 108 of FIG. 1. For example, the electronic device 470 can receive a verbal input and through an ASR system, similar to the ASR system 400 of FIGS. 4A and 4B, derive meaning from the verbal input and perform a particular function. The electronic device 470 includes a receiver 472, an information repository 474, and an natural language processor 476.

The receiver 472 is similar to the microphone 320 of FIG. 3. The receiver 472 receives sound waves such as voice data and converts the sound waves into electrical signal. The voice data received from the receiver 472 can be associated with the natural language processor 476 which interprets one or more verbal utterances spoken by a user. The receiver 472 can be a microphone similar to a dynamic microphone, a condenser microphone, a piezoelectric microphone, or the like. The receiver 472 can also receive verbal utterances from another electronic device. For example, the other electronic device can include a speaker, similar to the speaker 330 of FIG. 3 which creates verbal utterances. In another example, the receiver 472 can receive a wired or wireless signals representing verbal utterances.

The information repository 474 can be similar to memory 360 of FIG. 3. The information repository 474 represents any structure(s) capable of storing and facilitating retrieval of information (such as data, program code, or other suitable information on a temporary or permanent basis). The information repository 474 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc.

In certain embodiments, the information repository 474 includes the observable features 422 of FIG. 4B and the observable features 363 of FIG. 3. Information and content that is maintained in the information repository 474 can include the observable features 422 and a personalized language module associated with a user of the electronic device 470. The observable features 422 can be maintained in a log and updated at predetermined intervals. If the electronic device 470 includes multiple users, then the observable features 422 associated with each user as well as the personalized language model that is associated with each user can be included in the information repository 474. In certain embodiments, the information repository 474 can include the latent features derived via an auto-encoder (such as the auto-encoder 428 of FIG. 4B) based on the observable features 422.

The natural language processor 476 is similar to the ASR system 400 or a portion of the ASR system 400 of FIGS. 4A and 4B. The natural language processor 476 allows a user to interact with the electronic device 470 through sound such as voice and speech as detected by the receiver 472. The natural language processor 476 can include one or more processors for converting a user's speech into executable instructions. The natural language processor 476 allows a user to interact with the electronic device 470 by talking to the device. For example, a user can speak a command and the natural language processor 476 can extrapolate the sound waves and perform the given command, such as through the decoder 412 of FIG. 4A, and the contextualizing module 430 of FIG. 4B. In certain embodiments, the natural language processor 476 utilizes voice recognition, such as voice biometrics, to identify the user based on a voice pattern of the user, in order to reduce, filter or eliminate commands not originating from the user. Voice biometrics can select a particular language model for the individual who spoke the verbal utterance, when multiple users can be associated with the same electronic device, such as the electronic device 470. The natural language processor 476 can utilize a personalized language model to identify from the received verbal utterances a higher probability of the sequence of words. In certain embodiments, the natural language processor 476 can generate personalized language models based on previously created language models.

The personalized language models are a language models that are based on the individual speakers. For example, the personalized language model is based on interest of the user, as well as biographical data such as age, location, gender, and the like. In certain embodiments, the electronic device 470 can derive the interests of the user via an auto-encoder (such as the auto-encoder 428 of FIG. 4B, and the auto-encoder 500 of FIG. 5A). An auto-encoder can derive latent features based on the observable features (such as the observable features 422) that are stored in the information repository 474. The natural language processor 476 uses a personalized language model for the speaker or user who created the verbal utterance for speech recognition. The personalized language model can be created for locally on the electronic device or remotely such as through the personalized language model engine 484 of the server 480. For example, based on the derived latent features of the user, the personalized language model engine 484 generates a weighted language model specific to the interest and biographical information of the particular user. In certain embodiments, the observable features 422, the personalized language model, or a combination thereof are stored in an information repository that is external to the electronic device 470.

The server 480 can represent one or more local servers, one or more natural language processing servers, one or more speech recognition servers, one or more neural networks (such as an auto-encoder), or the like. The server 480 can be a web server, a server computer such as a management server, or any other electronic computing system capable of sending and receiving data. In certain embodiments, the server 480 is a "cloud" of computers interconnected by one or more networks, where the server 480 is a computing system utilizing clustered computers and components to act as a single pool of seamless resources when accessed through network 460. The server 480 can include a latent feature generator 482, a personalized language model engine 484, and an information repository.

The latent feature generator 482 is described in greater detail below with respect to FIGS. 5A, 5B, and 5C. In certain embodiments, the latent feature generator 482 is a component of the electronic device 470. The latent feature generator 482 can receive observable features, such as the observable features 422 from the electronic device 470. In certain embodiments, the latent feature generator 482 is a neural network. For example, the neural network can be an auto-encoder. The neutral network uses unsupervised learning to encode the observable features 422 of a particular user into latent representation of the observable features. In particular, the latent feature generator 482 identifies relationships between the observable features 422 of a user. For example, the latent feature generator 482 derives patterns between two or more of the observable features 422 associated with a user. In certain embodiments, the latent feature generator 482 compresses the input to a threshold level such that the input is reconstructed, and the input and the reconstructed input are substantially the same. The compressed middle layer represents the latent features.

The personalized language model engine 484 is described in greater detail below with respect to FIGS. 6A, 6B, and 7. The personalized language model engine 484 for each user, sorts the latent features for a particular user into clusters. The personalized language model engine 484 builds an information repository, such as the information repository 486 that is associated with each cluster. Each of the information repository 486 can include verbal utterances from a number of different users that share the same cluster or share an overlapping cluster. A language model can be constructed for each information repository 486 that is associated with each cluster. That is, the language models are built around clusters that were defined in spaces using latent features. The clusters can be mapped to a space that is defined by the latent features.

The number of clusters that the personalized language model engine 484 identifies can be predetermined. For example, the personalized language model engine 484 can be configured to derive a predetermined number of clusters. In certain embodiments, the quantity of clusters is data driven. For example, based on the quantity of derived latent features from the latent feature generator 482, can indicate to the personalized language model engine 484 the number of clusters. In another example, based on the number of identifiable groupings of text can indicate the number of clusters.

The personalized language model engine 484 then builds a personalized language model for the users based on each user's individual latent features, and text associated with each cluster. For example, a user can have latent features that overlap one or more clusters that are associated with a language model. The language models can be weighted and customized based on the magnitude of the latent features of the user. For example, if the clusters of the individual indicate an interest in sports, and a location in the New York City, N.Y., then the personalized language model engine 484 selects previously generated language models that are specific for those clusters, weights them according to the users individual clusters and generates a personalized language model for the user. The personalized language model can be stored in on the electronic device of the user, such as the information repository 474, or stored remotely in the information repository 486 accessed via the network 460.

The information repository 486 is similar to the information repository 474. Additionally, the information repository 486 can be similar to memory 230 of FIG. 2. The information repository 486 represents any structure(s) capable of storing and facilitating retrieval of information (such as data, program code, or other suitable information on a temporary or permanent basis). The information repository 486 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc. In certain embodiments, the information repository 486 includes the databases of verbal utterances associated with one or more clusters. The information repository 486 can also include cluster specific language models. The cluster specific language models can be associated with a particular cluster, such as an interests, age groups, geographic locations, genders, and the like. For example, a cluster specific language models can be a language model for persons from a particular area, or an age range, or similar political preferences, similar interests (such as sports, theater, TV shows, movies, music, among others, as well as sub-genres of each). The corpus of each of each databases of verbal utterances associated with one or more clusters can be used to create, build, and train the various language models.

Figure 5A:
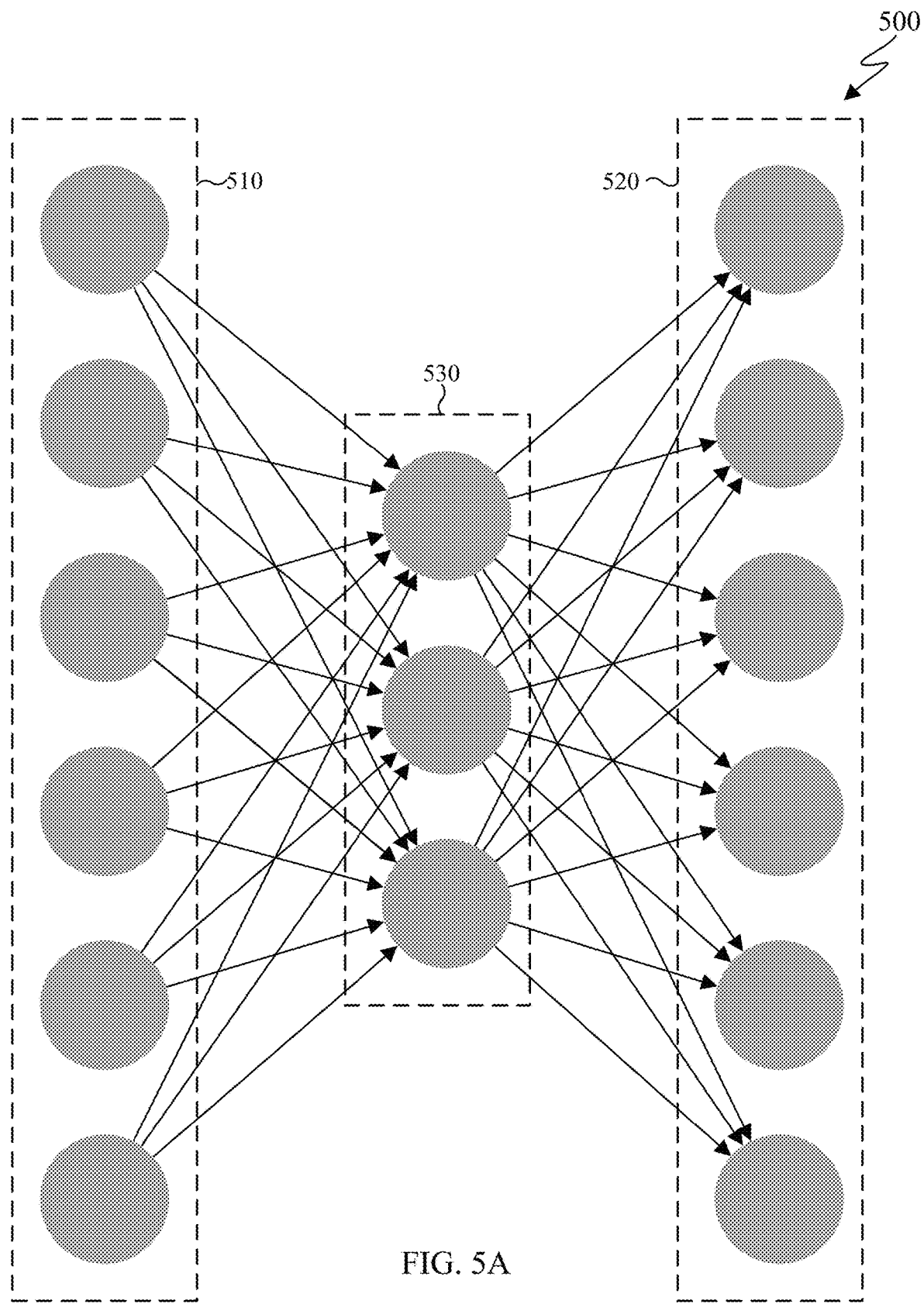
FIGS. 5A, 5B, and 5C illustrate an example auto-encoder in accordance with an embodiment of this disclosure.
Figures 5B, 5C:
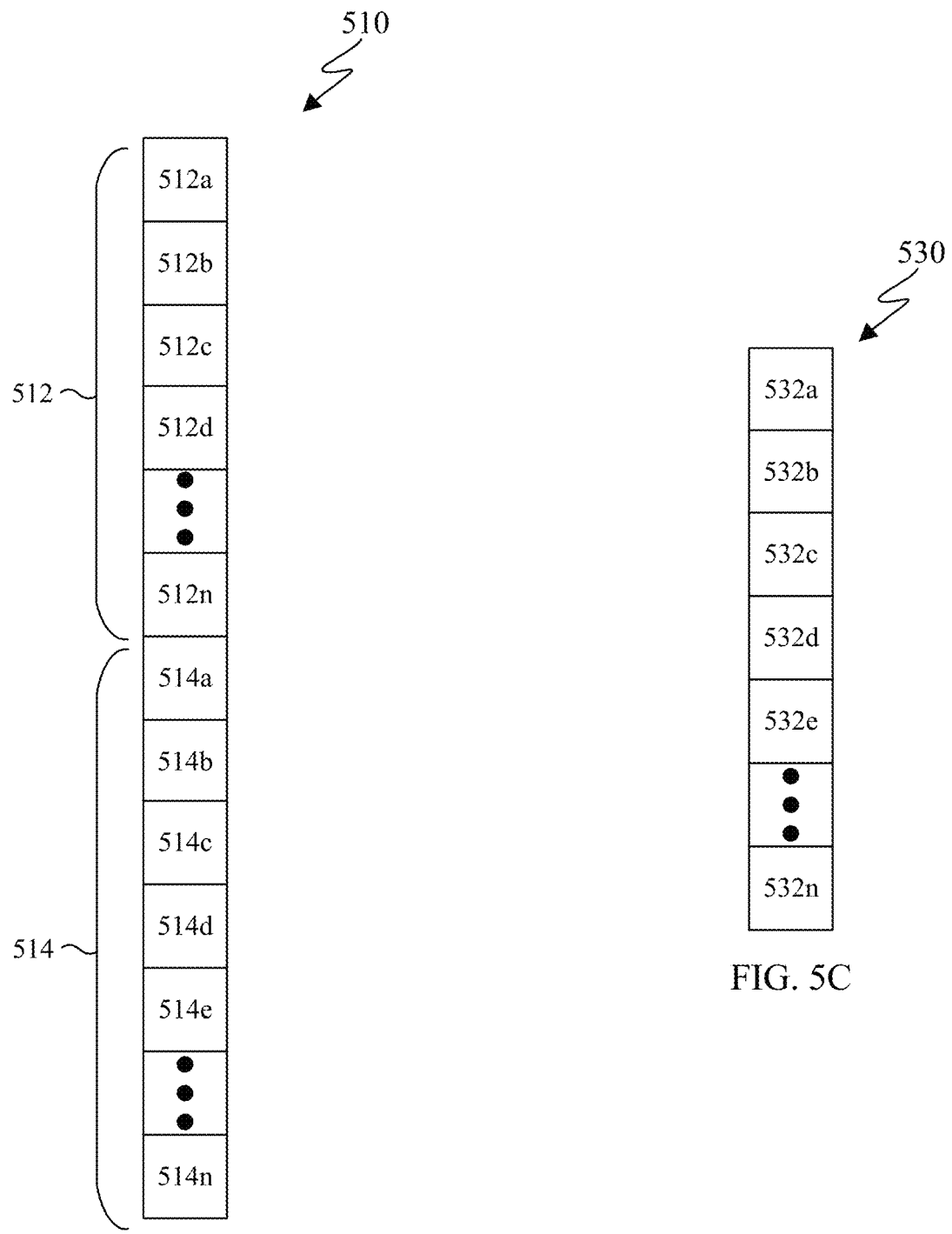

FIG. 5A illustrate an example auto-encoder 500 in accordance with an embodiment of this disclosure. FIGS. 5B and 5C illustrate different component aspects of the auto-encoder 500 in accordance with an embodiment of this disclosure. The embodiment of FIGS. 5A, 5B, and 5C are for illustration only. Other embodiments can be used without departing from the scope of the present disclosure.

The auto-encoder 500 is an unsupervised neural network. In certain embodiments, the auto-encoder 500 efficiently encodes high dimensional data. For example, the auto-encoder 500 compresses the high dimensional data to extract hidden or features. The auto-encoder 500 can be similar to the auto-encoder 428 of FIG. 4B, and the latent feature generator 482 of FIG. 4C. The auto-encoder 500 includes an input 510 an output 520 and latent features 530.

The auto-encoder 500 compresses the input 510 until a bottleneck that yields the latent features 530 and then decompresses the latent features 530 into the output 520. The output 520 and the input 510 are substantially the same. The latent features 530 are the input 510 of observable features that are compressed to a threshold such that when decompressed, the input 510 and the output 520 are substantially similar. If the compression of the input 510 is increased, then when the latent features are decompressed, the output 520 and the input 510 are not substantially similar due to the deterioration of the data from the compression. In certain embodiments, the auto-encoder 500 is a neural network that is trained to generate the latent features 530 from the input 510.

The input 510 represents the observable features, such as the observable features 363 of FIG. 3, and the observable features 422 of FIG. 4B. The input 510 is split into two portions that of the classic features 512 and the augmented features 514. The classic features 512 are similar to the classic features 424 of FIG. 4B. The augmented features 514 are similar to the augmented features 426 of FIG. 4B.

In certain embodiments, the classic features 512 include various data elements 512a through data element 512n (512a-512n). The data elements 512a-512n represent biological data concerning a particular user or individual. For example, the data element 512a can represent the age of the user. In another example, the data element 512b can represent the current location of the user. In another example, the data element 512c can represent the location of where the user was born. In another example, the data element 512d can represent the gender of the user. Other data elements can represent the educational level of the user, the device the user is currently using, the domain, the country, the language the user speaks, and the like.

The augmented features 514 include various data elements 514a through data element 514n (514a-514n). The data elements 514a-514n represent various aspects of the online footprint of a user. For example, one or more of the data elements 514a-514n can represent various aspects of a user profile on social media. In another example, one or more of the data elements 514a-514n can represent various messages the user sent or received, such as through SMS, or other messaging application. In another example, one or more of the data elements 514a-514n can represent posts drafted by the user such as on a blog, a review, or the like.

The latent features 530 include various learned features that include data elements 532a through data element 532n (532a-532n). The data elements 532a-532n are the compressed representation of the data elements 514a-514n. The auto-encoder 428, of FIG. 4B, is able to perform unsupervised neural network learning to generate an efficient encodings (the data elements 532a-532n) from the higher dimensional data, that of the data elements 514a-514n. The data elements 532a-532n, represent a bottle neck encoding, such that the auto-encoder 428 can reconstruct input 510 to the output 520. The data elements 532a-532n are the combination of the classic features 512 and augmented features 514. For example, the data elements 532a-532n include enough information that the auto-encoder can create the output 520 that substantially matches the input 510. That is a single dimension of the latent features 530 (which includes the data elements 532a-532n) can include one or more classic features 512 and augmented features 514. For example, a single data element, such as the data element 532b, can include a classic features 512 and augmented features 514 that are related to one another.

Figure 6A:
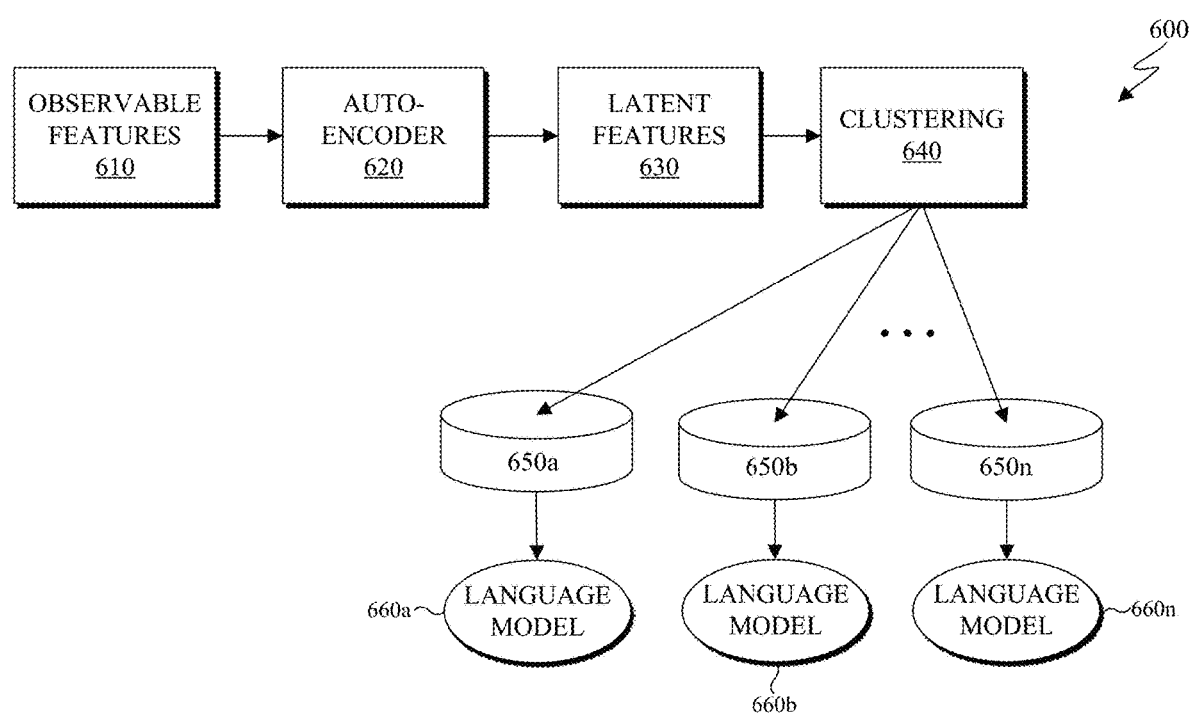
FIG. 6A illustrates an example process for creating multiple personalized language models in accordance with an embodiment of this disclosure.
Figure 6B:
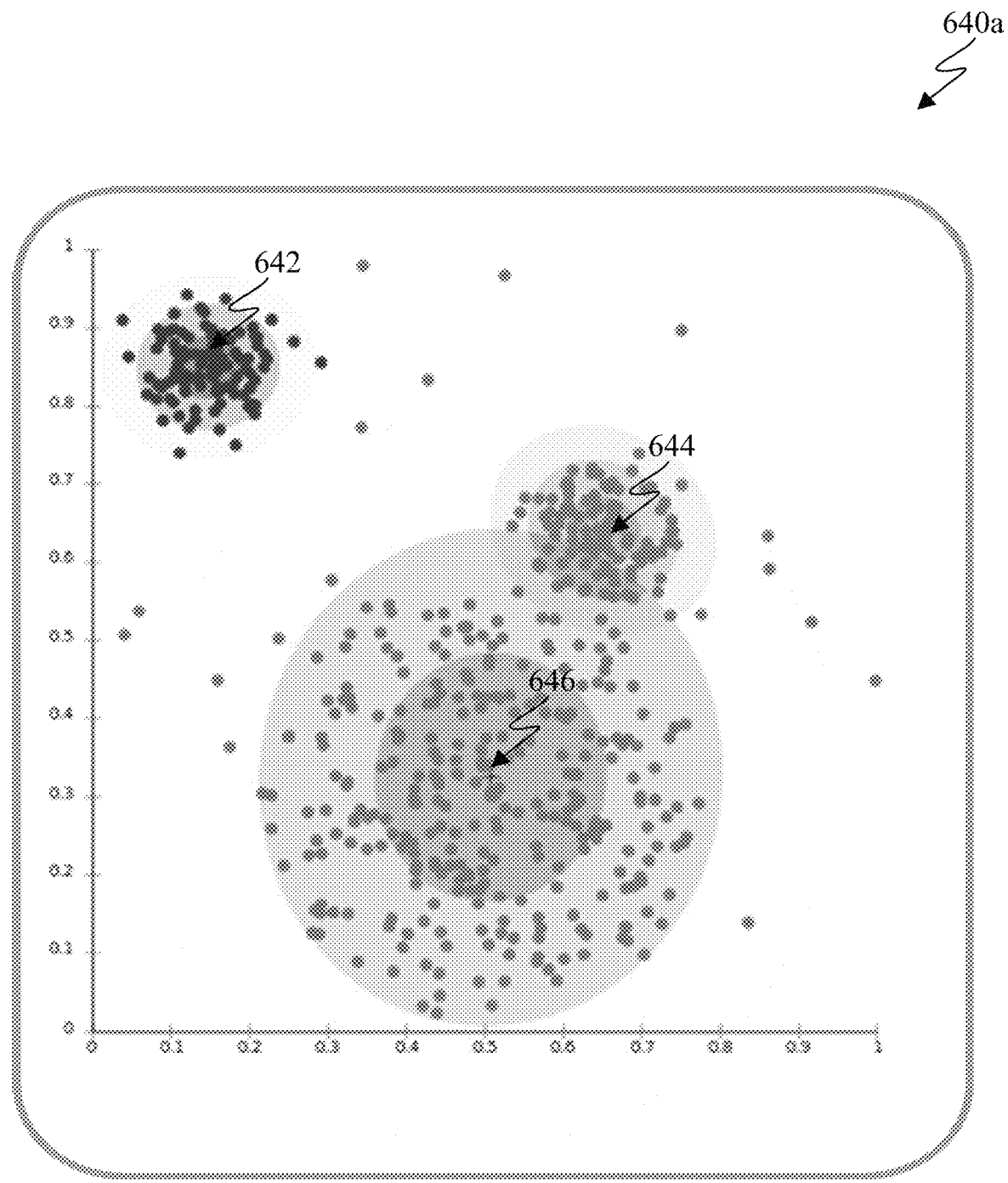
FIG. 6B illustrates an example cluster in accordance with an embodiment of this disclosure.

FIGS. 6A and 6B illustrate a process of creating multiple personalized language models. FIG. 6A illustrates an example process 600 for creating language models in accordance with an embodiment of this disclosure. FIG. 6B illustrates an example cluster 640a in accordance with an embodiment of this disclosure. The embodiment of the process 600 and the cluster 640a are for illustration only. Other embodiments could be used without departing from the scope of the present disclosure.

The process 600 can performed by a server similar to the server 104 of FIG. 1, the server 480 of FIG. 4C, and include internal components similar to that of the server 200 of FIG. 2. The process 600 can performed by a server similar to any of the client devices 106-114 of FIG. 1, the electronic device 470 of FIG. 4C, and include internal components similar to that of the electronic device 300 of FIG. 3. The process 600 can include internal components similar to the ASR system 400 of FIGS. 4A and 4B, respectively. The process 600 can be performed by the personalized language model engine 484 of FIG. 4C.

The process 600 includes observable features 610, an auto-encoder 620, latent features 630, clustering 640, information repositories 650a, 650b through 650n (collectively information repositories 650a-650n) and language models

660a, 660b, and 660n (collectively language models 660a-660n). The process 600 illustrates the training and creation of multiple language models, such as the language models 660a-660n based on the observable features 610. The language models 660a-660n are not associated with a particular person or user, rather the language models 660a-660n are associated with particular latent features.

The language models 660a-660n can be associated with particular subject matter, or multiple subject matters. For example, the language model 660a can be associated with sports, while the language model 660b is associated with music. In another example, the language model 660a can be associated with football, while the language model 660b is associated with soccer, and the language model 660c is associated with basketball. That is, if the cluster is larger than a threshold, a language model can be constructed for that particular subject. For instance, a language model can be constructed for sports, or if each type of sport is large enough, then specific language models can be constructed for sports that are beyond a threshold. Similarly topics of music, can include multiple genres, politics can include multiple parties, computing games can include different genres, platforms, and the like. Individual language models can be constructed for each group or subgroup based on the popularity of the subject as identified by the corpus of text each cluster. It is noted that a cluster of points includes similar properties. For example, a group of people who discuss sports a similar topic can have various words that mean something to the group but have another meaning if the word is spoken in connection with another group. Language models that are associated with a particular cluster can associate a higher probability of a word have a first meaning than another meaning, based on the cluster and the corpus of words that are associated with the particular latent feature.

In certain embodiments, the process 600 is performed prior to enrolling users into the ASR system. For example, the process 600 creates multiple language models that are specific a group of users that share a common latent feature. The multiple created language models can then be tailored to users who enroll in the ASR system, in order to create personalized language models for each user. In certain embodiments, the process 600 is performed at predetermined intervals. Repeating the training and creation of langue models enables each language model to adapt to current vernacular that is associated with each latent feature. For example, new language models can be created based on the changes to the verbal utterances and the observable features 610 associated with the users of the ASR system.

The observable features 610 are similar to the observable features 363 of FIG. 3, the observable features 422 of FIG. 4B, and the input 510 of the FIG. 5A. In certain embodiments, the observable features 610 represent observable features for a corpus of users. That is, the observable features 610 can be associated with multiple individuals. In certain embodiments, the observable features 610 that are associated with multiple individuals, can be used to train the auto-encoder 620. The observable features includes both the classic features (such as the classic features 424 of FIG. 4B) and the augmented features (such as the augmented features 426 of FIG. 4B). Each of the elements within the observable features 610 can be represented as a vector of a multi-dimensional vector.

The auto-encoder 620 is similar to the auto-encoder 428 of FIG. 4B and the auto-encoder 500 of FIG. 5A. The auto-encoder 620 identifies the latent features 630 from the observable features 610. The latent features 630 can be represented as a multi-dimensional vector. It is noted that the multi-dimensional latent feature vector, as derived by the auto-encoder 620 can include a large number of dimensions. The multi-dimensional latent feature vector includes fewer dimensions than the multi-dimensional observable feature vector. For example, the multi-dimensional latent feature vector can include over 100 dimensions, with each dimension representing a latent feature that is associated with one or more users.

Clustering 640 identifies groups of text associated with each latent feature. Clustering 640 can identify cluttering of text such as illustrated in the example cluster 640a of FIG. 6B. The cluster 640a depicts three clusters, cluster 642, cluster 644 and cluster 646. The clustering 640 plots the latent features 630 to identify a cluster. Each cluster is centered on a centroid. The centroid is the position of the highest weight of the latent features. Each point on the clustering 640 can be a verbal utterance that is associated with a latent feature. For example, if each dimension of the clustering 640 corresponds to a latent feature, each point represents a verbal utterance. A cluster can be identified when of verbal utterances create a centroid. The clustering 640 can be represented via two-dimensional graph or a multi-dimensional graph. For example, the cluster 640a can be presented in a multi-dimensional graph, such that each axis of the cluster 640a is a dimension of the latent features 630.

In certain embodiments, the number of clusters can be identified based on the data. For example, the latent features can be grouped into certain identifiable groupings, and then each grouping is identified as a cluster. In certain embodiments, the number of clusters can be a predetermined number. For example, clustering 640 plots the latent features 630 and identifies a predetermined number of clusters, based on the size, density, or the like. If the predetermined number of clusters is three, clustering 640 identifies three centroids with the highest concentration, such as the centroids of the cluster 642, the cluster 644 and the cluster 646.

After clustering 640 of the latent features 630, the information repositories 650a-650n are generated. The information repositories 650a-650n can be similar to the information repository 486 of FIG. 4C. The information repositories 650a-650n represents verbal utterances that are associated with each cluster. Using the corpus of text in the each of the respective information repositories 650a-650n, the language models 660a-660n are generated. The language models 660a-660n are created around clusters that are defined in spaces using the latent features.

Figure 7:
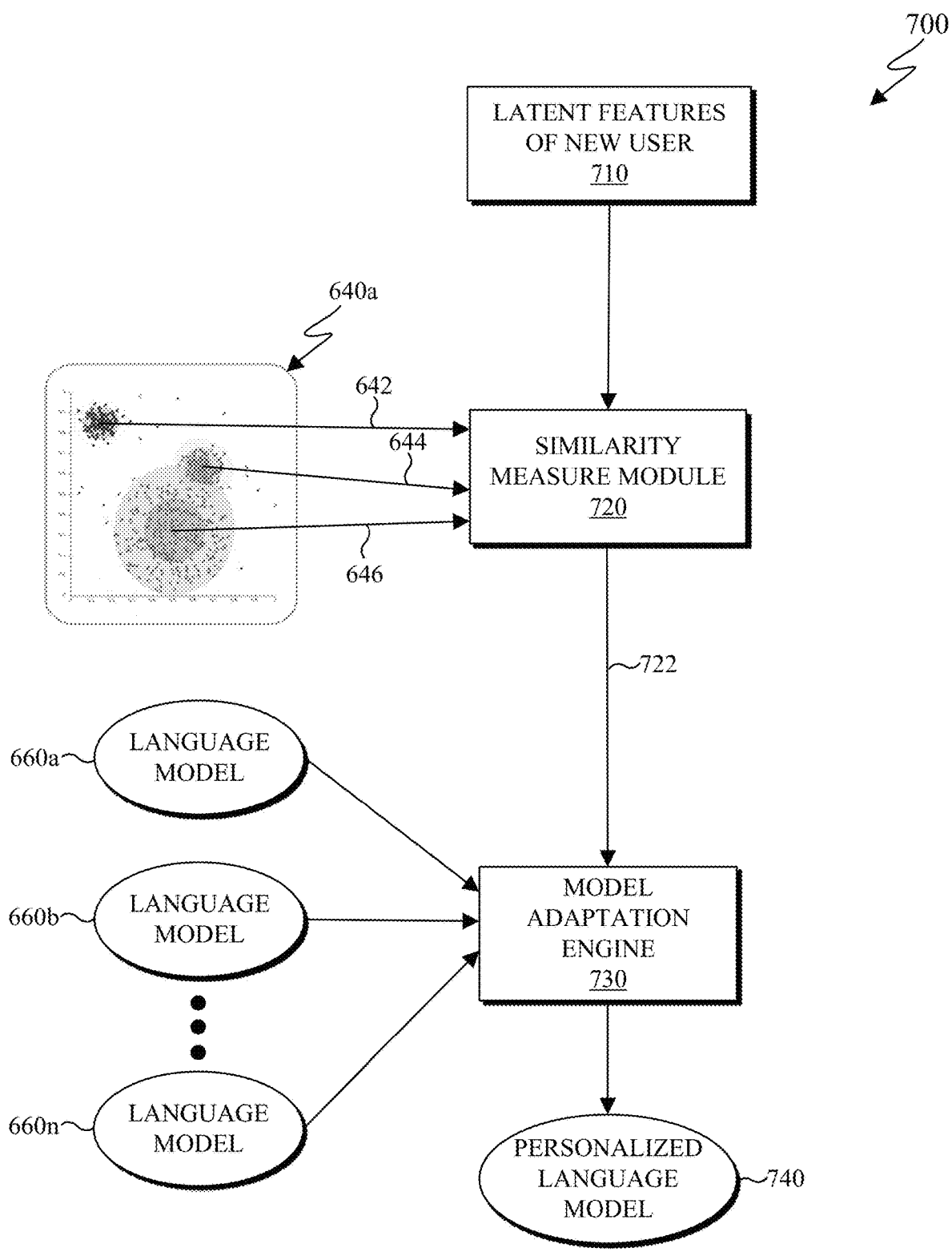
FIG. 7 illustrates an example process for creating a personalized language model for a new user in accordance with an embodiment of this disclosure.

FIG. 7 illustrates an example process 700 for creating a personalized language model for a new user in accordance with an embodiment of this disclosure. The embodiment of the process 700 is for illustration only. Other embodiments could be used without departing from the scope of the present disclosure.

The process 700 can performed by a server similar to the server 104 of FIG. 1, the server 480 of FIG. 4C, and include internal components similar to that of the server 200 of FIG. 2. The process 700 can performed by a server similar to any of the client devices 106-114 of FIG. 1, the electronic device 470 of FIG. 4C, and include internal components similar to that of the electronic device 300 of FIG. 3. The process 700 can include internal components similar to the ASR system 400 of FIGS. 4A and 4B, respectively. The process 700 can be performed by the personalized language model engine 484 of FIG. 4C.

The process 700 includes latent features of a new user 710, the cluster 640a (of FIG. 6B), a similarity measure module 720, a model adaptation engine 730 which uses the language models 660a-660n of FIG. 6B, and a personalized language model 740. The personalized language model 740 is defined based on the latent features of the new user 710.

When a new user joins the ASR system, the observable features, such as the observable features 422 of FIG. 4B of the new user are gathered. In certain embodiments, the personalized language model engine 484 of FIG. 4C instructs the electronic device 470 to gather the observable features. In certain embodiments, the personalized language model engine 484 gathers the observable features of the user. Some of the observable features can be identified when the user creates a profile with the ASR system. Some of the observable features can be identified based on the user profile, SMS text messages of the user, social medial posts of the user, reviews written by the user, blogs written by the user, the online footprint of the user, and the like. An auto-encoder, similar to the auto-encoder 428 of FIG. 4B identifies the latent features of the new user 710. In certain embodiments, the electronic device 470 can transmit the observable features to an auto-encoder that is located remotely from the electronic device 470. In certain embodiments, the electronic device 470 includes an auto-encoder that can identify the latent features of the new user 710.

The similarity measure module 720 receives the latent features of the new user 710 and identifies levels of similarity between the latent feature of the new user 710 and the clusters 642, 644, and 646 generated by the clustering 640 of FIG. 6B. It is noted that more or less clusters can be included in the cluster 640a. In certain embodiments, the similarities are identified by a cosine similarity metric. In certain embodiments, the similarity measure module 720 identifies how similar the user is to one or more clusters. In certain embodiments, the similarity measure module 720 includes an affinity metric. The affinity metric defines a similarity of different clusters of a new user to the various clusters already identified such as those of the cluster 640a In certain embodiments, the similarity measure module 720 generates a function 722 and forwards the function to the model adaptation engine 730. The function 722 represents similar measure of the user to the various clusters 642, 644, and 646. For example, the function 722 can be expressed as $S(u, t_i)$. In the expression $S(u, t_i)$, each cluster (clusters 642, 644, and 646) are identified by '$t_1$', '$t_2$', and '$t_3$', respectively, and the latent features of the new user 710 is identified by 'u'.

The model adaptation engine 730 combines certain language models to generate a language model personalized for the user, 'u,' based on the function 722. The model adaptation engine 730 generates the personalized language model 740 based on probabilities and linear interpolation. For example, the model adaptation engine 730, identifies certain clusters that are similar to the latent features of the user. The identified clusters can be expressed in the function, such as $S(u, t_i)$, where $t_i$ represents the clusters most similar to the user. Each cluster is used to build particular language models 660a-66n. The model adaptation engine 730 then weights each language model (language models 660a-66n) based on the function 722 to create a personalized language model 740. In certain embodiments, if one or more of the language models 660a-660n are below a threshold, those language models are excluded and not used to create the personalized language model 740, by the model adaptation engine 730.

Since each cluster (such as cluster 642) represents a group of persons who have similar interests (latent features), therefore a language model based a particular cluster will have a probability assigned to each word. As a result, two language models, based on different clusters can have different probabilities associated with similar words. Based on the similarity a user is to each cluster, the model adaptation engine 730 combines the probabilities associated with the various words in the respective language models and assigns a unique weight for each word, thereby creating the personalized language model 740. For example, the process 700 can be expressed by Equation 3 below.

$$LM_u = F(LM_1, LM_2, \ldots, LM_n, S(t_1,u), S(t_2,u), \ldots, S(t_n,u)) \quad (3)$$

Equation 3 describes the process 700 of enrolling a new user and creating a personalized language model 740 for the new user. An auto-encoder, similar to the auto-encoder 500 of FIG. 5A, obtains latent features, expressed by variable 'h.' The latent vectors can be clustered into similar groups '$C_i$.' The centroid of each cluster, '$C_i$,' is denoted by '$t_i$.' For each such cluster, a language $LM_i$ is created based on all the text corpus corresponding to the points in the cluster '$C_i$' that is projected back into the original observable features (such as the observable features 610) and expressed by the variable 'V.' Each of the variables LM represents particular a language models that are constructed from a cluster. In certain embodiments, the function 722 ($S(t_i, u)$), is created by Equation 4 below. Similarly, the function 'F' of Equation 3 is expressed by Equation 5 below. Additionally, Equation 6 below depicts the construction of a database that is used to create a corresponding language model.

$$\frac{1}{d(t_1, u)} \quad (4)$$

$$P_{LM_u}(w) = \sum_i P(U \in c_i) \cdot P_{LM_i}(w) \quad (5)$$

$$DB_{C_i} = \bigcup_{p_i \in C_i} DB(p_i) \quad (6)$$

Equation 4 denotes that the function 722 is obtained based on the inverse of $d(t_1,u)$, where the function $d(t_1,u)$ is the Euclidean distance between the vector 'u,' to the closest cluster $t_1$. Equation 5 represents the function of Equation 3 which is used to create the personalized language model 740. The expression $P(u \in C_i) \propto S(t_i, u)$, and $P_{LM_i}(w)$ denote the probability of a given word 'w' based on the language model '$LM_i$.' For example, a general purpose language model LM is based on the probabilities $P_{LM}(w)$, where 'w' is the word sequence hypothesis of $[w_0, \ldots, w_k]$, with '$w_i$' being the corresponding word in the sequence. For example, $P_{LM}$ is the probability that is associated with each word of a particular language model, such as the language model 'i.' Similarly, $LM_u$ is the personalized language model that is associated with a particular user, 'u,' and such as the personalized language model 740. Equation 6 above denotes the creation of a database 'DB' for a particular cluster '$c_i$.'

In certain embodiments, once a personalized language model, such as the personalized language model 740, is constructed for a particular user, a dynamic run-time contextual rescoring can be performed in order to update the personalized language model based on updates to the language models (such as the language models 660a-660n). Dynamic run-time contextual rescoring is expressed by Equation 7, below.

$$P_{LM}(W) \propto P_{LM_U}(w) \cdot P_{LM}(W|D) \cdot P_{LM}(W|DC) \cdot P_{LM}(W|DM) \quad (7)$$

The expressions $P_{LM}(W|DM)$, $P_{LM}(W|DC)$, and $P_{LM}(W|D)$ denote separate probabilities' of a word sequence 'W' given by respective elements. For example, 'DM' corresponds to a dialogue management context, similar to the dialogue manager 418 of FIG. 4B. In another example, 'DC' corresponds to a domain classifier, similar to the domain classifier 414 of FIG. 4B. In another example, 'D' corresponds to a device identification, such as the device context 420 of FIG. 4B. For example, Equation 7 denotes that once a personalized language model 740 is constructed for a particular user, based on the users latent features, the language models (such as the language models 660a-660n), that are used to constructed the personalized language model 740 can be updated. If the language models (such as the language models 660a-660n) that are used to construct the personalized language model 740 can be updated, a notification can be generated, notifying the personalized language model 740 to be updated accordingly. In certain embodiments, the personalized language model 740 is not updated even when the language models (such as the language models 660a-660n) that are used to construct the personalized language model 740 are updated. The language models 660a-660n, can be updated based on contextual information from dialogue management, domain, device, and the like.

Figure 8:
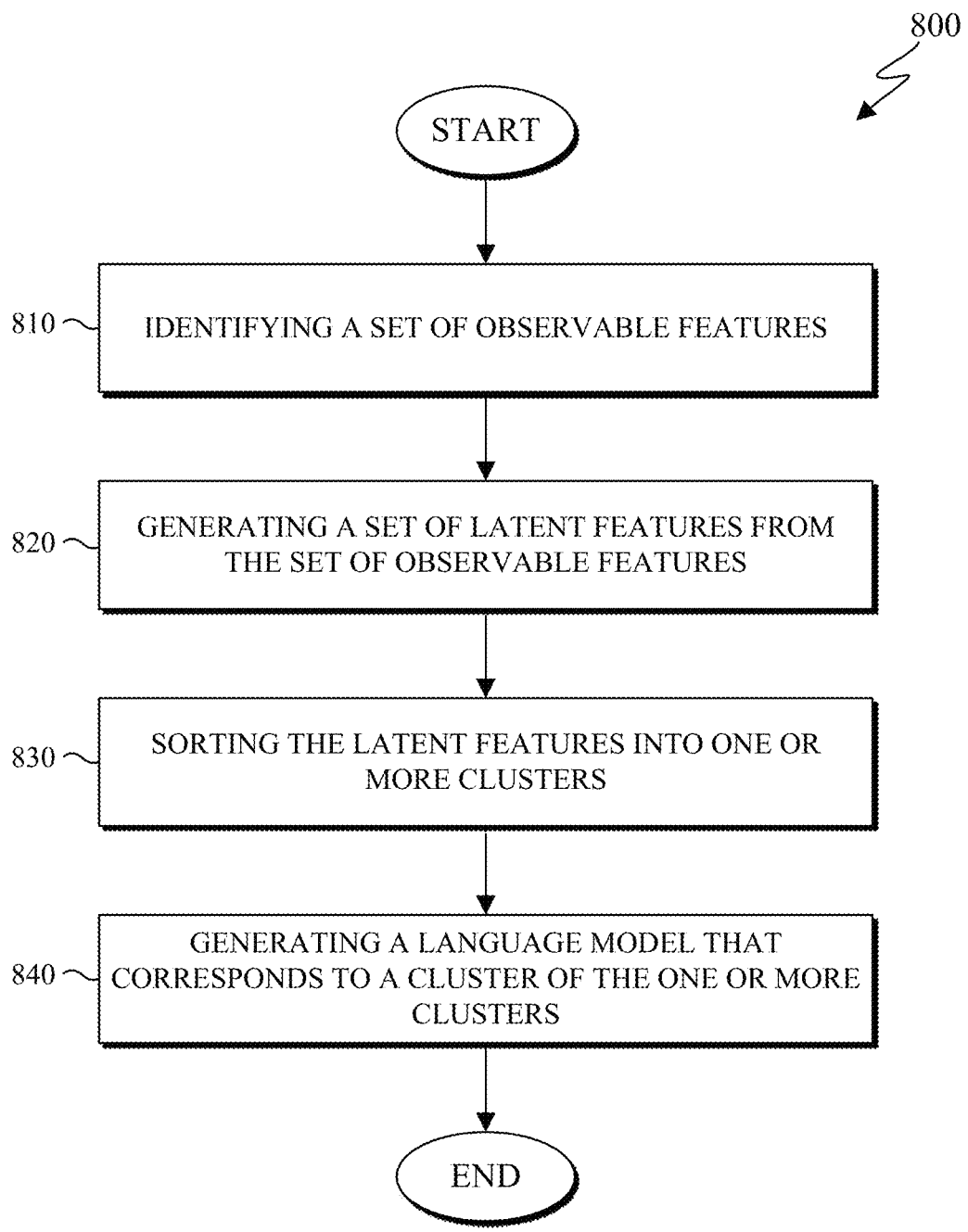
FIG. 8 illustrates an example method determining an operation to perform based on contextual information, in accordance with an embodiment of this disclosure.

FIG. 8 illustrates an example method determining an operation to perform based on contextual information, in accordance with an embodiment of this disclosure. FIG. 8 does not limit the scope of this disclosure to any particular embodiments. While process 800 depicts a series of sequential steps, unless explicitly stated, no inference should be drawn from that sequence regarding specific order of performance. For example, performance of steps as depicted in process 800 can occur serially, concurrently, or in an overlapping manner. The performance of the steps depicted in process 800 can also occur with or without intervening or intermediate steps. The method for speech recognition is performed by any of the client devices 104-114 of FIG. 1, the server 200 of FIG. 2, the electronic device 300 of FIG. 3, the ASR system 400 of FIGS. 4A and 4B, the electronic device 470 of FIG. 4C, and the server 480 of FIG. 4C. For ease of explanation, the process 800 for speech recognition is performed by the server 480 of FIG. 4C. However, the process 800 can be used with any other suitable system.

In block 810 the server 480 identifies a set of observable features. The set of observable features can include at least one classic feature and at least one augmented feature. The classic features can include biographical information about the individual (such as age, gender, location, hometown, and the like). The augmented features can include features that are acquired about the user, such as SMS text messages, social media posts, written reviews, written blogs, logs, environment, context, and the like. The augmented features can be derived by the online footprint of the user.

In block 820 the server 480 generates a set of latent features from the set of observable features. To generate the set of latent features, the processor, generates a multidimensional vector based on the set of observable features. Each dimension of the multidimensional vector corresponding to one feature of the set of observable features. The processor then reduces a quantity of dimensions of the multidimensional vector to derive the set of latent features. In certain embodiments, the quantity of dimensions of the multidimensional vector is reduced using an auto-encoding procedure. Auto-encoding can be performed by an auto-encoder neural network. The auto-encoder can be located on the server 480, or another device such as an external auto-encoder or the electronic device that receives the verbal utterance and associated with the user such as one of the client devices 106-114.

In block 830 the server 480 sorts the latent features into one or more clusters. Each of the one or more clusters represents verbal utterances of users that share a portion of the latent features. Each cluster includes verbal utterances associated with the particular latent features that are mapped.

In block 840 the server 480 generates a language model that corresponds to a cluster of the one or more clusters. The language model represents a probability ranking of the verbal utterances that are associated with the users of the cluster.

In certain embodiments, the language model includes at least first language model and a second language model. Each of the at least first and second language models corresponding to one of the one or more clusters, respectively. The server 480 can then identify identifying a centroid of each of the one or more clusters. Based on the identified centroid, the server 480 constructs a first database based on the verbal utterances of a first set of users that are associated with a first of the one or more clusters. Similarly based on a second identified centroid, the server 480 constructs a second database based on the verbal utterances of a second set of users that are associated with a second of the one or more clusters. Thereafter, the server 480 can generate the first language model based on the first database and the second language model based on the second database. The server can also generate the language model based on weighting the first and second language models.

In certain embodiments, the language model includes multiple language models such as a at least first language model and a second language model. Each language model corresponding to one of the one or more clusters, respectively. The server 480 can acquire one or more observable features associated with a new user. After new observable features are acquired, the processor identifies one or more latent features for the new user based on the one or more observable features that are associated with the new user. The server 480 can identify levels of similarity between the one or more latent features of the new user and the set of latent features that are included in the one or more clusters. After identifying levels of similarity between the one or more latent features of the new user and the set of latent features that are included in the one or more clusters, the server 480 generates a personalized weighted language model for the new user. The personalized weighted language model based on the levels of similarity between the one or more latent features of the new user and the one or more clusters.

To generate the personalized weighted language model for the new user, the server 480 can identify a cluster that is below a threshold of similarity between the one or more latent features of the new user and the set of latent features associated with a subset of the one or more clusters. In response to identifying the cluster being below the threshold of similarity, the server 480 excludes a language model that is associated with the identified cluster in generating the personalized weighted language model for the new user.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
   identifying a set of observable features about one or more users;
   generating latent features about the one or more users based on compressing data corresponding to the set of observable features into the latent features;
   sorting latent features about a particular user, from the latent features about the one or more users, into one or more clusters, each of the one or more clusters representing verbal utterances of a group of users that share a portion of the latent features about the particular user, wherein the one or more clusters is identifiable based on a size, density, or centroid; and
   generating a language model that corresponds to a specific cluster of the one or more clusters, the language model representing a probability ranking of the verbal utterances that are associated with the group of users of the specific cluster.

2. The method of claim 1, wherein generating the latent features comprises:
   generating a multidimensional vector based on the set of observable features, each dimension of the multidimensional vector corresponding to one feature of the set of observable features; and
   reducing a quantity of dimensions of the multidimensional vector to derive the latent features.

3. The method of claim 2, wherein the quantity of dimensions of the multidimensional vector is reduced using an auto-encoding procedure.

4. The method of claim 1, wherein:
   the language model includes a first language model and a second language model, each of the at least first and second language models corresponding to one of the one or more clusters, respectively, and
   generating the language model comprises:
      identifying a centroid of each of the one or more clusters;
      constructing a first database based on the verbal utterances of a first group of users that are associated with one of the one or more clusters;
      constructing a second database based on the verbal utterances of a second group of users that are associated with another of the one or more clusters; and
      after constructing the first database and the second database, generating the first language model based on the first database and the second language model based on the second database.

5. The method of claim 1, wherein the set of observable features comprises at least one classic feature and at least one augmented feature,
   wherein the at least one classic feature comprises at least one of: an age of a user, a gender of the user, a current location of the user, or a location where the user was born, and
   wherein the at least one augmented feature comprises features acquired by the user.

6. The method of claim 1, wherein:
   the language model includes one or more language models, each of the one or more language models corresponding to one of the one or more clusters that represent the verbal utterances, and
   wherein the method further comprises:
      acquiring one or more observable features associated with a new user;
      identifying one or more latent features of the new user based on the one or more observable features that are associated with the new user;
      identifying levels of similarity between the one or more latent features of the new user and the sorted latent features; and
      generating a personalized weighted language model for the new user, the personalized weighted language model based on the levels of similarity between the one or more latent features of the new user and the one or more clusters that represent verbal utterances of groups of users that share a portion of the latent features.

7. The method of claim 6, wherein:
   the language model includes multiple language models, and
   the method further comprises:
      identifying one cluster that is below a threshold of similarity between the one or more latent features of the new user and the latent features associated with a subset of the one or more clusters; and
      excluding one of the multiple language models that is associated with the one cluster that is below a threshold of similarity when generating the personalized weighted language model for the new user.

8. An electronic device comprising: a memory; and
   a processor operably connected to the memory, the processor configured to: identify a set of observable features about one or more users;
   generate latent features about the one or more users based on compressing data corresponding to the set of observable features into the latent features;
   sort latent features about a particular user, from the latent features about the one or more users, into one or more clusters, each of the one or more clusters represents verbal utterances of a group of users that share a portion of the latent features about the particular user, wherein the one or more clusters is identifiable based on a size, density, or centroid; and
   generate a language model that corresponds to a specific cluster of the one or more clusters, the language model representing a probability ranking of the verbal utterances that are associated with the group of users of the specific cluster.

9. The electronic device of claim 8, wherein to generate the latent features, the processor is further configured to:
   generate a multidimensional vector based on the set of observable features, each dimension of the multidimensional vector corresponding to one feature of the set of observable features; and reduce a quantity of dimensions of the multidimensional vector to derive the latent features.

10. The electronic device of claim 9, wherein the quantity of dimensions of the multidimensional vector is reduced using an auto-encoding procedure.

11. The electronic device of claim 8, wherein:
the language model includes a first language model and a second language model, each of the at least first and second language models corresponding to one of the one or more clusters, respectively, and
to generate the language model, the processor is further configured to:
identify a centroid of each of the one or more clusters;
construct a first database based on the verbal utterances of a first group of users that are associated with one of the one or more clusters;
construct a second database based on the verbal utterances of a second group of users that are associated with another of the one or more clusters; and
after constructing the first database and the second database, generate the first language model based on the first database and the second language model based on the second database.

12. The electronic device of claim 8, wherein the set of observable features comprises at least one classic feature and at least one augmented feature.

13. The electronic device of claim 8, wherein:
the language model includes one or more language models, each of the one or more language models corresponds to one of the one or more clusters that represent the verbal utterances, and
the processor is further configured to:
acquire one or more observable features associated with a new user;
identify one or more latent features of the new user based on the one or more observable features that are associated with the new user;
identify levels of similarity between the one or more latent features of the new user and the sorted latent features; and
generate a personalized weighted language model for the new user, the personalized weighted language model based on the levels of similarity between the one or more latent features of the new user and the one or more clusters that represent verbal utterances of groups of users that share a portion of the latent features.

14. The electronic device of claim 13, wherein:
the language model includes multiple language models, and
the processor is further configured to:
identify one cluster that is below a threshold of similarity between the one or more latent features of the new user and the latent features associated with a subset of the one or more clusters; and
exclude one of the multiple language models that is associated with the one cluster that is below a threshold of similarity when the personalized weighted language model for the new user is generated.

15. A non-transitory computer readable medium embodying a computer program, the computer program comprising computer readable program code that, when executed by a processor of an electronic device, causes the processor to:
identify a set of observable features about one or more users;

generate latent features about the one or more users based on compressing data corresponding to the set of observable features into the latent features;
sort latent features about a articular user, from the latent features about the one or more users, into one or more clusters, each of the one or more clusters represents verbal utterances of a group of users that share a portion of the latent features about the particular user, wherein the one or more clusters is identifiable based on a size, density, or centroid; and
generate a language model that corresponds to a specific cluster of the one or more clusters, the language model represents a probability ranking of the verbal utterances that are associated with the group of users of the specific cluster.

16. The non-transitory computer readable medium of claim 15, wherein to generate the latent features, the program code, when executed by the processor, further causes the processor to:
generate a multidimensional vector based on the set of observable features, each dimension of the multidimensional vector corresponding to one feature of the set of observable features; and
reduce a quantity of dimensions of the multidimensional vector to derive the latent features.

17. The non-transitory computer readable medium of claim 15, wherein:
the language model includes a first language model and a second language model, each of the at least first and second language models corresponding to one of the one or more clusters, respectively, and
to generate the language model, the program code, when executed by the processor, further causes the processor to:
identify a centroid of each of the one or more clusters;
construct a first database based on the verbal utterances of a first group of users that are associated with one of the one or more clusters;
construct a second database based on the verbal utterances of a second group of users that are associated with another of the one or more clusters; and
after constructing the first database and the second database, generate the first language model based on the first database and the second language model based on the second database.

18. The non-transitory computer readable medium of claim 15, wherein the set of observable features comprises at least one classic feature and at least one augmented feature.

19. The non-transitory computer readable medium of claim 15, wherein:
the language model includes one or more language models, each of the one or more language models corresponding to one of the one or more clusters that represent the verbal utterances, and
the program code, when executed by the processor, further causes the processor to:
acquire one or more observable features associated with a new user;
identify one or more latent features of the new user based on the one or more observable features that are associated with the new user;
identify levels of similarity between the one or more latent features of the new user and the sorted latent features; and
generate a personalized weighted language model for the new user, the personalized weighted language model based on the levels of similarity between the one or more latent features of the new user and the one or more clusters that represent verbal utterances of groups of users that share a portion of the latent features.

20. The non-transitory computer readable medium of claim 19, wherein:
the language model includes multiple language models, and
the program code, when executed by the processor, further causes the processor to:
identify one cluster that is below a threshold of similarity between the one or more latent features of the new user and the latent features associated with a subset of the one or more clusters; and
exclude one of the multiple language models that is associated with the one cluster that is below a threshold of similarity when the personalized weighted language model for the new user is generated.

* * * * *